US011789737B2

(12) United States Patent
Lemay et al.

(10) Patent No.: US 11,789,737 B2
(45) Date of Patent: Oct. 17, 2023

(54) CAPABILITY-BASED STACK PROTECTION FOR SOFTWARE FAULT ISOLATION

(71) Applicant: Intel Corporation, Santa Clara, CA (US)

(72) Inventors: Michael Lemay, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/703,121

(22) Filed: Mar. 24, 2022

(65) Prior Publication Data

US 2022/0214879 A1    Jul. 7, 2022

(51) Int. Cl.
    G06F 9/30       (2018.01)
    G06F 21/60      (2013.01)
    G06F 9/50       (2006.01)
    G06F 21/52      (2013.01)

(52) U.S. Cl.
    CPC ........ *G06F 9/30145* (2013.01); *G06F 9/3004* (2013.01); *G06F 9/30116* (2013.01); *G06F 9/30134* (2013.01); *G06F 9/5016* (2013.01); *G06F 21/52* (2013.01); *G06F 21/602* (2013.01)

(58) Field of Classification Search
    CPC ............... G06F 9/30145; G06F 9/3004; G06F 9/30116; G06F 9/30134; G06F 9/5016; G06F 21/52; G06F 21/602; G06F 9/3016
    See application file for complete search history.

(56) References Cited

U.S. PATENT DOCUMENTS

| 9,684,511 | B2  |   | 6/2017  | Shanbhogue et al. |
|-----------|-----|---|---------|-------------------|
| 11,163,569| B2  |   | 11/2021 | LeMay et al.      |
| 2016/0381050 | A1 | * | 12/2016 | Shanbhogue ....... G06F 12/1081 726/23 |
| 2017/0177339 | A1 | * | 6/2017  | Shanbhogue ........... G06F 21/52 |
| 2020/0125501 | A1 |   | 4/2020  | Durham et al.     |
| 2020/0125770 | A1 |   | 4/2020  | LeMay et al.      |
| 2021/0150040 | A1 |   | 5/2021  | Durham et al.     |
| 2021/0218547 | A1 | * | 7/2021  | Weiler ................. G06F 9/5016 |
| 2022/0114104 | A1 |   | 4/2022  | LeMay             |

OTHER PUBLICATIONS

Liljestrand et al.; PACStack: an Authenticated Call Stack; 30th {USENIX} Security Symposium 21; 2021 (Year: 2021).*

(Continued)

*Primary Examiner* — Corey S Faherty
(74) *Attorney, Agent, or Firm* — Nicholson De Vos Webster & Elliott LLP

(57) ABSTRACT

Systems, methods, and apparatuses for generating a protected stack allocation pointer. In certain examples, a hardware processor core comprises a decoder circuit to decode a single instruction into a decoded single instruction, the single instruction comprising one or more fields to indicate a stack allocation index as an operand, and an opcode to indicate that an execution circuit is to generate a stack allocation pointer to reference an address in a stack and an address in a shadow stack; and an execution circuit to execute the decoded single instruction according to the opcode.

24 Claims, 29 Drawing Sheets

(56) References Cited

OTHER PUBLICATIONS

Zou et al.; Buddy Stacks: Protecting Return Addresses with Efficient Thread-Local Storage and Runtime Re-Randomization; Feb. 2022 (Year: 2022).*

Intel Corporation, "Intel 64 and IA-32 Architectures Software Developer's Manual: vol. 1: Basic Architecture," Dec. 2021, 482 pages, Order No. 253665-076US.

Lucas Davi et al., "Hardware-Assisted Fine-Grained Control-Flow Integrity: Towards Efficient Protection of Embedded Systems Against Software Exploitation," DAC'14, Jun. 2014, 6 pages, ACM.

Matthew Kolosick et al., "Isolation without Taxation," Proc. ACM Program. Lang. Jan. 2022, pp. 27:1-27:30, vol. 6, No. POPL, Article 27, ACM.

Mihai Budiu et al., "Architectural Support for Software-Based Protection," ASID'06, Oct. 2006, 10 pages, ACM.

Robert N.M. Watson et al., "An Introduction to CHERI," Technical Report, No. 941, Sep. 2019, 43 pages, University of Cambridge, Cambridge, UK.

Robert N.M. Watson et al., "Capability Hardware Enhanced RISC Instructions: CHERI Instruction-Set Architecture (Version 8)," Technical Report, No. 951, Oct. 2020, 590 pages, University of Cambridge, Cambridge, UK.

Robert N.M. Watson et al., "CHERI C/C++ Programming Guide," Technical Report, No. 947, Jun. 2020, 33 pages, University of Cambridge, Cambridge, UK.

* cited by examiner

CAPABILITY 110 → | VALIDITY TAG 110A | BOUNDS 110B | ADDRESS 110C (E.G., VIRTUAL ADDRESS) |

FIG. 2A

CAPABILITY 110 → | VALIDITY TAG 110A | PERM. 110D | OBJ. TYPE 110E | BOUNDS 110B | ADDRESS 110C (E.G., VIRTUAL ADDRESS) |

FIG. 2B

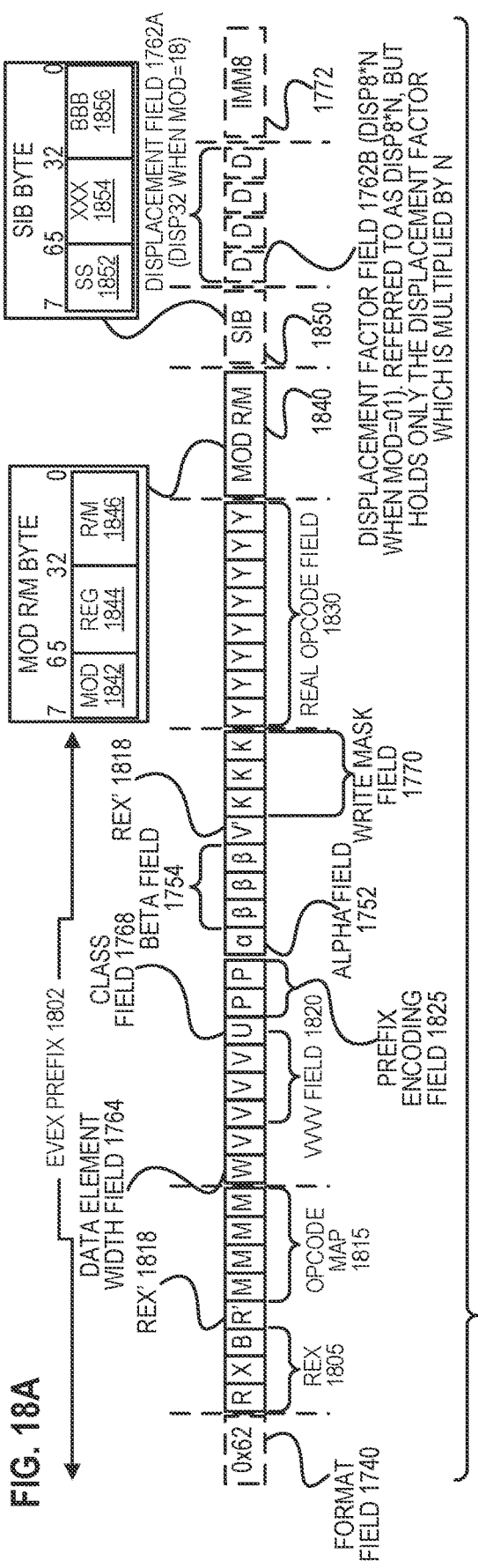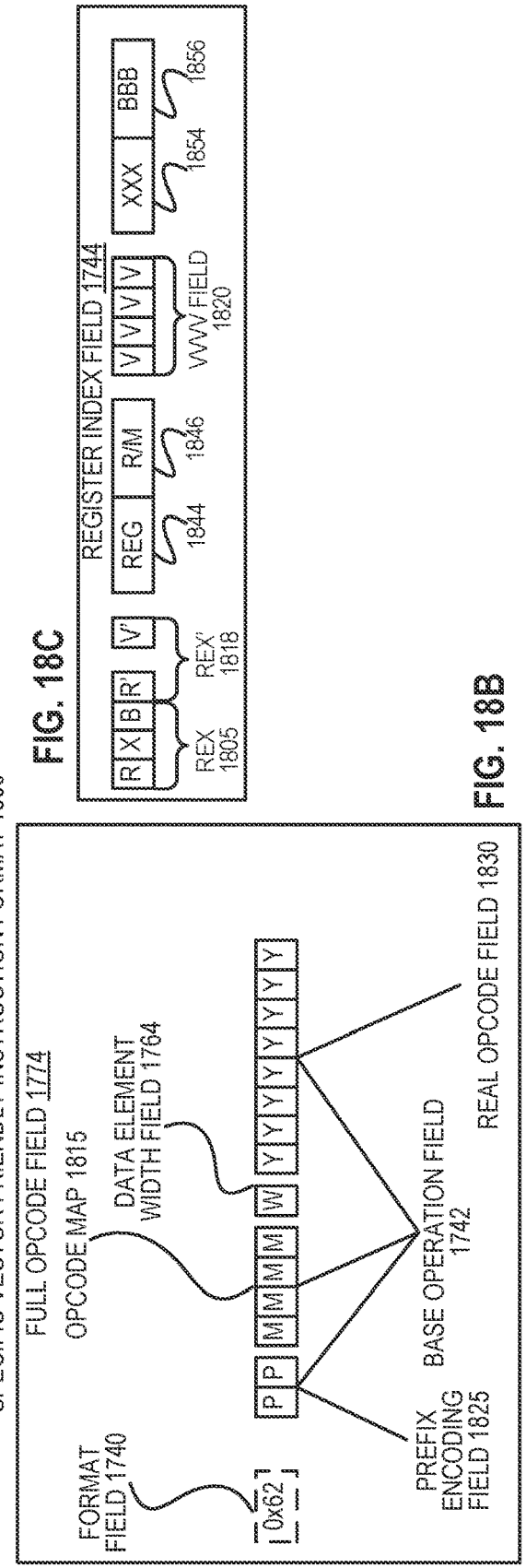

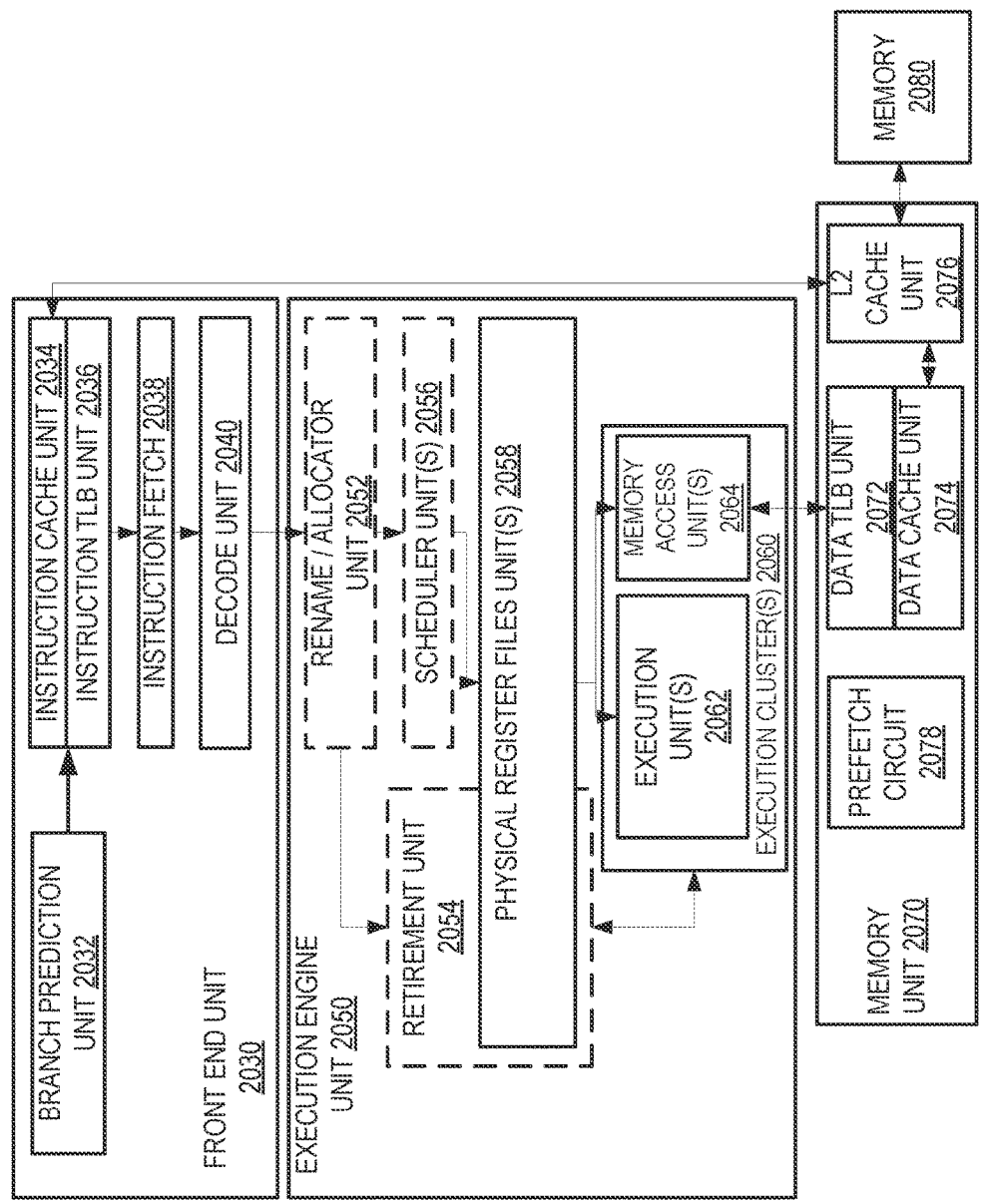

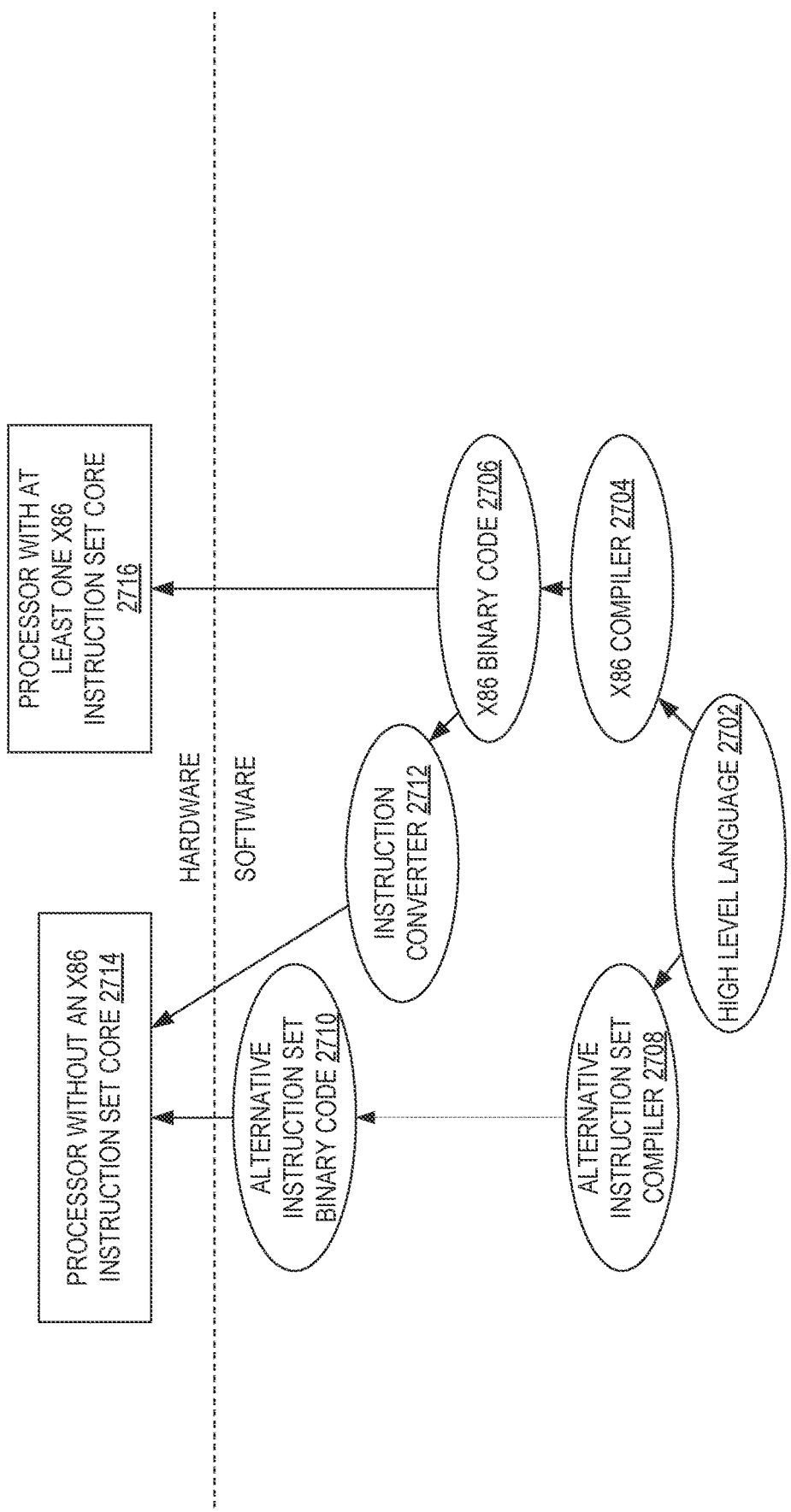

CAPABILITY-BASED STACK PROTECTION FOR SOFTWARE FAULT ISOLATION

TECHNICAL FIELD

The disclosure relates generally to software fault isolation in computing systems, and, more specifically, the disclosure relates to circuitry for implementing capability-based stack protection.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

In some computing systems, software is divided into fine-grained compartments to protect sensitive data from being disclosed or corrupted. Switching compartments can be slow due in part to the need to switch stacks. In some systems, segmentation can be used to block unauthorized access to the stack where sensitive data may be stored. However, segmentation is available only in 32-bit mode, which is obsolete for current 64-bit systems.

BRIEF DESCRIPTION OF THE DRAWINGS

The present disclosure is illustrated by way of example and not limitation in the figures of the accompanying drawings, in which like references indicate similar elements and in which:

FIG. 2A illustrates an example format of a capability including a validity tag field, a bounds field, and an address field according to examples of the disclosure.

FIG. 2B illustrates an example format of a capability including a validity tag field, a permission field, an object type field, a bounds field, and an address field according to examples of the disclosure.

FIG. 18A is a block diagram illustrating fields for the generic vector friendly instruction formats in FIGS. 17A and 17B according to examples of the disclosure.

FIG. 18B is a block diagram illustrating the fields of the specific vector friendly instruction format in FIG. 18A that make up a full opcode field according to one example of the disclosure.

FIG. 18C is a block diagram illustrating the fields of the specific vector friendly instruction format in FIG. 18A that make up a register index field according to one example of the disclosure.

FIG. 20A is a block diagram illustrating both an exemplary in-order pipeline and an exemplary register renaming, out-of-order issue/execution pipeline according to examples of the disclosure.

FIG. 20B is a block diagram illustrating both an exemplary example of an in-order architecture core and an exemplary register renaming, out-of-order issue/execution architecture core to be included in a processor according to examples of the disclosure.

FIG. 27 is a block diagram contrasting the use of a software instruction converter to convert binary instructions in a source instruction set to binary instructions in a target instruction set according to examples of the disclosure.

DETAILED DESCRIPTION

Figure 1:
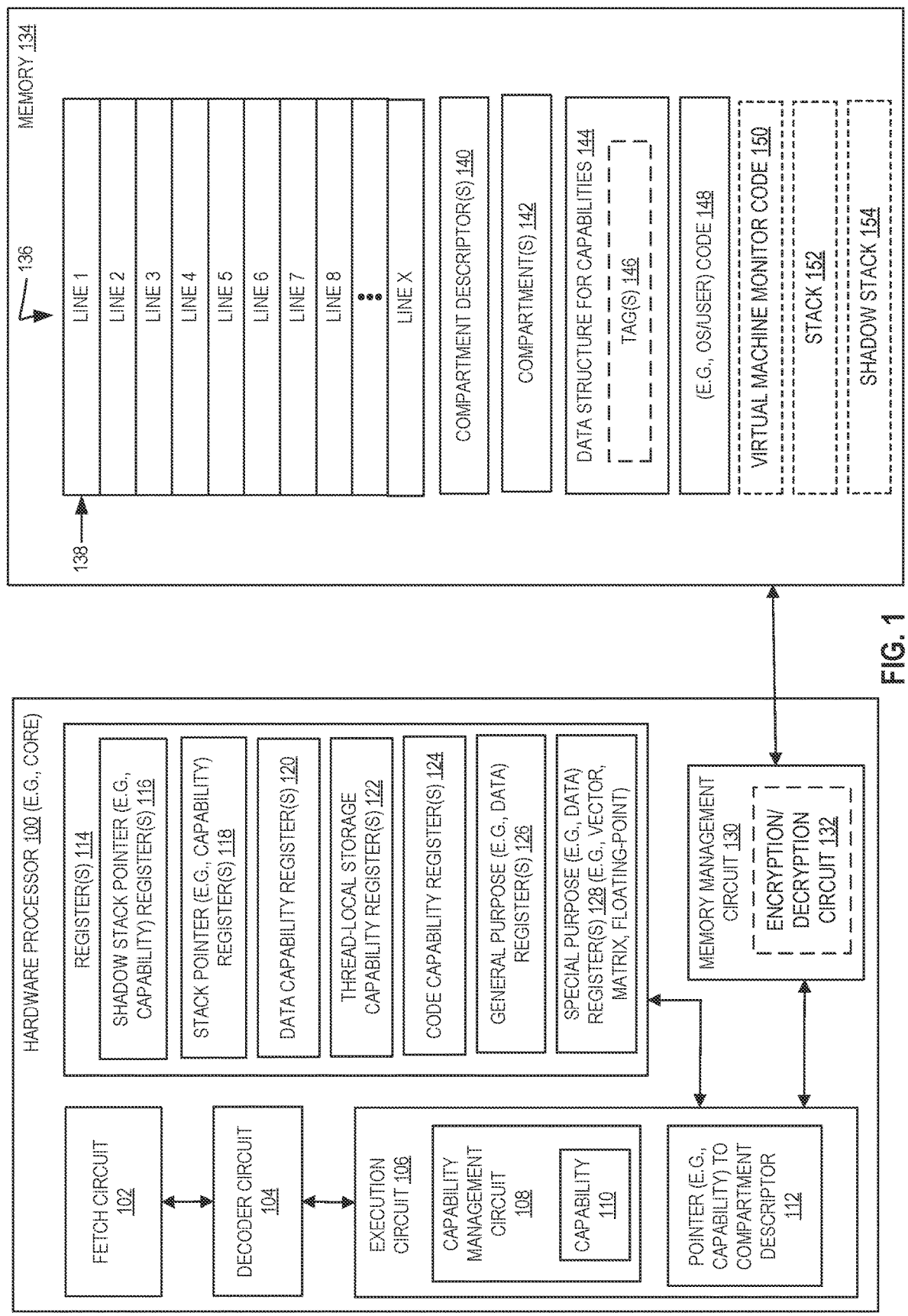
FIG. 1 illustrates a block diagram of a hardware processor including a capability management circuit and coupled to a memory having a plurality of compartments according to examples of the disclosure.

The technology described herein configures capability registers to maintain strong isolation between compartments, including their stack data, without requiring expensive stack switches.

In the following description, numerous specific details are set forth. However, it is understood that examples of the disclosure may be practiced without these specific details. In other instances, well-known circuits, structures, and techniques have not been shown in detail in order not to obscure the understanding of this description.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. In certain examples, a computer includes a hardware processor requesting access to (e.g., load or store) data and the memory is local (or remote) to the computer. A system may include a plurality of cores, for example, with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) standard.

Memory may be divided into separate blocks (e.g., one or more cache lines), for example, with each block managed as a unit for coherence purposes. In certain examples, a (e.g., data) pointer (e.g., an address) is a value that refers to (e.g., points to) the location of data, for example, a pointer may be an (e.g., virtual) address and that data is (or is to be) stored at that address (e.g., at the corresponding physical address). In certain examples, memory is divided into multiple lines, e.g., and each line has its own (e.g., unique) address. For example, a line of memory may include storage for 512 bits, 256 bits, 128 bits, 64 bits, 32 bits, 16 bits, or 8 bits of data, or any other number of bits.

In certain examples, memory corruption (e.g., by an attacker) is caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain examples herein utilize memory corruption detection (MCD) hardware and/or methods, for example, to prevent an out-of-bound access or an access with a dangling pointer. In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a context switch for an access). Certain examples implement a capability-based addressing scheme by extending the data storage (for example, extending memory (e.g., and register) addressing) with an additional bit (e.g., writable only if permitted by the capability management circuit) that indicates that a particular location is a capability, for example, such that all memory accesses (e.g., loads, stores, and/or instruction fetches) must be authorized by a respective capability or be denied. Example formats of capabilities are discussed below in reference to FIGS. 2A and 2B.

Certain processors include a compartmentalization architecture, e.g., with a corresponding compartment identifier ("CID") for each compartment. In certain examples, the CID value is programmed into a specified (e.g., control) register of a processor core. In certain examples, a CID is a 16-bit identifier, although any number of bits may be used (e.g., 8 bits, 32 bits, 64 bits, etc.). In certain examples, the CID uniquely identifies a compartment, allowing (e.g., 64 k) compartments to be allocated in a single process address space. In certain examples, all data accesses are tagged if compartmentalization is enabled and the tag for a data access must match the current (e.g., active) compartment identifier programmed in the (e.g., control) register of the processor (e.g., a portion of the tag must be the CID value).

In certain examples, each compartment includes multiple items (e.g., categories) of information, e.g., multiple state elements. In certain examples, each item of information within a single compartment (e.g., each state element within a single compartment) includes a respective capability (e.g., address and security metadata) to that stored information.

Figure 3:
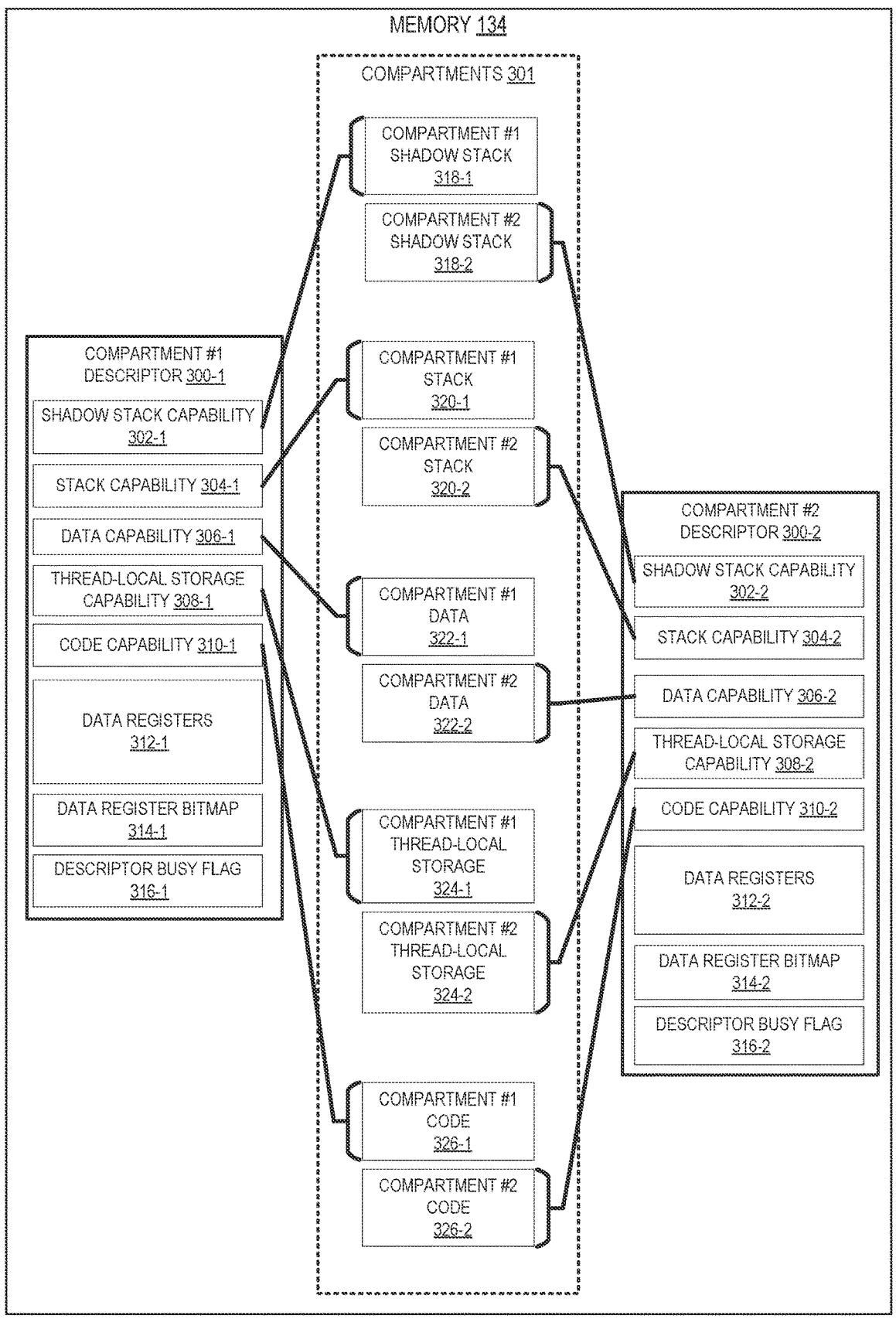
FIG. 3 illustrates a memory having a first compartment, a first compartment descriptor for the first compartment, a second compartment, and a second compartment descriptor for the second compartment according to examples of the disclosure.

In certain examples, each compartment has a respective compartment descriptor, for example, storing one or more capabilities for a corresponding one or more items of information stored within a single compartment (for example, with each item stored in a respective memory region of its compartment, e.g., as shown in FIG. 3). In certain examples, each compartment descriptor is stored in memory (e.g., and not in a register) and includes a pointer (or capability) to that compartment descriptor. Example formats of compartments and their respective compartment descriptors are discussed below in reference to FIG. 3.

In certain examples, utilizing a compartment includes switching from a first compartment (e.g., whose elements (e.g., state elements) are currently within and/or identified by the registers of a processor (e.g., core)) to a second compartment (e.g., whose elements are within memory and/or identified within memory and are to be loaded into the registers of the processor core).

However, in certain examples, switching compartments requires updating (e.g., saving and/or restoring) multiple "capability" types of registers (for example, and their corresponding metadata, see, e.g., FIGS. 2A-2B)), for example, one or more registers for each of: a default data region, a stack, code, thread-local storage, etc. In certain examples, switching compartments is to additionally update (e.g., save and/or restore) general purpose (e.g., data) registers and/or special purpose (e.g., data) registers, for example, floating-point registers, vector (e.g., Advanced Vector eXtension (AVX)) registers, two-dimensional matrix (e.g., Advanced Matrix eXtension (AMX)) registers, etc.

The instructions disclosed herein are improvements to the functioning of a processor (e.g., of a computer) itself. Instruction decode circuitry (e.g., decoder circuit 104) not having such an instruction as a part of its instruction set would not decode as discussed herein. An execution circuit (e.g., execution circuit 106) not having such an instruction as a part of its instruction set would not execute as discussed herein. Examples herein are improvements to the functioning of a processor (e.g., of a computer) itself as they provide enhanced security (e.g., security hardening).

Turning now to the Figures, FIG. 1 illustrates a block diagram of a hardware processor 100 (e.g., core) including a capability management circuit 108 and coupled to a memory 134 having a plurality of compartments 142 according to examples of the disclosure. Although the capability management circuit 108 is depicted within the execution circuit 106, it should be understood that the capability management circuit can be located elsewhere, for example, in another component of hardware processor 100 (e.g., within fetch circuit 102) or separate from the depicted components of hardware processor 100.

Depicted hardware processor 100 includes a hardware fetch circuit 102 to fetch an instruction (e.g., from memory 134), e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware processor 100 includes a hardware decoder circuit 104 to decode an instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware execution circuit 106 is to execute the decoded instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134.

In certain examples, an instruction utilizes a compartment descriptor 140, e.g., storing in memory 134 the pointers and/or capabilities to the multiple items (e.g., categories) of information, e.g., multiple state elements, in a corresponding compartment 142. This is discussed further in reference to FIG. 3.

In certain examples, an instruction utilizes (e.g., takes as an operand) a pointer 112 to the address where a particular compartment descriptor 140 is stored, e.g., with the compartment descriptor including one or more (e.g., a plurality of) pointers and/or capabilities to the corresponding items (e.g., state elements) stored in its compartment 142. In certain examples, an instruction utilizes (e.g., takes as an operand) a capability 112 (e.g., an address and security metadata) to the address where a particular compartment descriptor 140 is stored, e.g., with the compartment descriptor including one or more (e.g., a plurality of) pointers and/or capabilities to the corresponding items (e.g., state elements) stored in its compartment 142.

In certain examples, capability management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction, is to allow access to memory 134 storing a capability (e.g., a capability in a global variable referencing a heap object) and/or (ii) if a non-capability instruction, is not to allow access to memory 134 storing (1) a capability (e.g., in a compartment descriptor 140) and/or (2) state, data, and/or instructions (e.g., an object) protected by a capability (e.g., in a compartment 142). In certain examples, capability management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular register is a "capability" type of register (e.g., instead of a general-purpose data register) (e.g., implying that certain register(s) are not to be used to store a capability or capabilities). In certain examples, capability management circuit 108 is to manage the capabilities, e.g., only the capability management circuit is to set and/or clear validity tags (e.g., in memory and/or in register(s)). In certain examples, capability management circuit 108 is to clear the validity tag of a capability in a register in response to that register being written to by a non-capability instruction. In certain examples, a capability management circuit does not permit separate access by capability instructions to individual capabilities within a compartment descriptor. In certain examples, a compartment descriptor has a predetermined format with particular locations for capabilities, which renders a set of explicit validity tag bits unnecessary, e.g., in contrast to a general capability instruction that will check explicit validity tag bits. In certain examples, a capability instruction is not needed to use a capability to access non-capability data, e.g., the capability instruction is used to update, initialize, or perform some other restricted operation on a capability.

In certain examples, the source storage location (e.g., virtual address) for a capability 110 in memory 134 (e.g., in a compartment descriptor 140) is an operand of an instruction (e.g., microcode or micro-instruction) (e.g., having a mnemonic of LoadCap) that is to load the capability from the memory 134 (e.g., from the compartment descriptor 140) into register(s) 114. In certain examples, the destination storage location (e.g., virtual address) for capability 110 in memory 134 (e.g., in a compartment descriptor 140) is an operand of an (e.g., user or supervisor level) instruction (e.g., microcode or micro-instruction) (e.g., having a mnemonic of StoreCap) that is to store the capability from the register(s) 114 into memory 134 (e.g., into compartment descriptor 140).

In certain examples, the compartment descriptor is identified by a pointer. In certain examples, the compartment descriptor (e.g., storing one or more capabilities in it) is identified by its own capability, and thus protected by that capability (e.g., separate from the one or more capabilities stored in the compartment descriptor).

In certain examples, the source storage location (e.g., virtual address) in memory 134 (e.g., in a compartment 142) for state, data, and/or instructions (e.g., an object) protected by the bounds of a "capability with bounds" 110 is an operand of an (e.g., supervisor level or user level) instruction (e.g., microcode or micro-instruction) (e.g., having a mnemonic of LoadData) that is to load the state, data, and/or instructions (e.g., an object) protected by those bounds from the memory 134 (e.g., from a compartment 142) into register(s) 114. In certain examples, the destination storage location (e.g., virtual address) in memory 134 (e.g., in a compartment 142) for state, data, and/or instructions (e.g., an object) to-be-protected by the bounds of a "capability with bounds" 110 is an operand of an (e.g., supervisor level or user level) instruction (e.g., microcode or micro-instruction) (e.g., having a mnemonic of StoreData) that is to store the state, data, and/or instructions (e.g., an object) protected by those bounds from the register(s) 114 into memory 134 (e.g., into a compartment 142). In certain examples, the instruction is requested for execution by executing user code and/or OS code 148 (e.g., or some other privileged process authorized to do so). In certain examples, an instruction set architecture (ISA) includes one or more instructions for manipulating the bounds field, e.g., to set the lower bound and/or upper bound of an object.

In certain examples, the source storage location (e.g., virtual address) in memory 134 (e.g., in a compartment 142) for state, data, and/or instructions (e.g., an object) protected by the metadata and/or bounds of the "capability with metadata and/or bounds" 110 is an operand of an (e.g., supervisor level or user level) instruction (e.g., microcode or micro-instruction) (e.g., having a mnemonic of LoadData) that is to load the state, data, and/or instructions (e.g., an object) protected by the metadata and/or bounds from the memory 134 (e.g., from a compartment 142) into register(s) 114. In certain examples, the destination storage location (e.g., virtual address) in memory 134 (e.g., in a compartment 142) for state, data, and/or instructions (e.g., an object) to-be-protected by the metadata and/or bounds of the "capability with metadata and/or bounds" 110 is an operand of an (e.g., supervisor level or user level) instruction (e.g., microcode or micro-instruction) (e.g., having a mnemonic of StoreData) that is to store the state, data, and/or instructions (e.g., an object) protected by the metadata and/or bounds from the register(s) 114 into memory 134 (e.g., into a compartment 142). In certain examples, the instruction is requested for execution by executing user code and/or OS code 148 (e.g., or some other privileged process authorized to do so). In certain examples, an instruction set architecture (ISA) includes one or more instructions for manipulating the capability field(s) (e.g., the fields in FIGS. 2A-2B), e.g., to set the metadata and/or bound(s) of an object in memory.

In certain examples, capability management circuit 108 is to enforce security properties on changes to capability data (e.g., metadata), for example, for the execution of a single instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability manipulation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, capability management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a capability management circuit 108 provide the foundation on which a capability-based OS, compiler, and runtime can implement a certain programming language (e.g., C and/or C++) language memory safety and compartmentalization.

In certain examples, the capability is stored in a single line of data. In certain examples, the capability is stored in multiple lines of data. For example, a block of memory may be lines 1 and 2 of data of the (e.g., physical) addressable memory 136 of memory 134 having an address 138 to one (e.g., the first) line (e.g., line 1). Certain examples have a memory of a total size X, where X is any positive integer. Although the addressable memory 136 is shown separate from certain regions (e.g., compartment descriptor(s) 140 and compartments 142), it should be understood that those regions (e.g., compartment descriptor(s) 140 and compartments 142) may be within addressable memory 136.

In certain examples, capabilities (e.g., one or more fields thereof) themselves are also stored in memory 134, for example, in data structure 144 (e.g., table) for capabilities. In certain examples, a (e.g., validity) tag 146 is stored in data structure 144 for a capability stored in memory. In certain examples, tags 146 (e.g., in data structure 144) are not accessible by non-capability (e.g., load and/or store) instructions. In certain examples, a (e.g., validity) tag is stored along with the capability stored in memory (e.g., in one contiguous block). In certain examples, capabilities are stored in compartment descriptors 140, e.g., with a compartment descriptor indicated (e.g., identified) by a pointer (or capability) 112 to that compartment descriptor.

Depicted hardware processor 100 includes one or more registers 114, for example, one or any combination (e.g., all of): shadow stack pointer (e.g., capability) register(s) 116, stack pointer (e.g., capability) register(s) 118, data capability register(s) 120, thread-local storage capability register(s) 122, code capability register(s) 124, general purpose (e.g., data) register(s) 126, or special purpose (e.g., data) register(s) 128. In certain examples, a user is allowed access to only a proper subset (e.g., not all) of registers 114.

In certain examples, memory 134 includes a stack 152 (e.g., and a shadow stack 154). A stack may be used to push (e.g., load data onto the stack) and/or pop (e.g., remove or pull data from the stack). In one example, a stack is a last in, first out (LIFO) data structure. As examples, a stack may be a call stack, data stack, or a call and data stack. In one example, a context for a first thread may be pushed and/or popped from a stack. For example, a context for a first thread may be pushed to a stack when switching to a second thread (e.g., and its context). Context (e.g., context data) sent to the stack may include (e.g., local) variables and/or bookkeeping data for a thread. A stack pointer (e.g., stored in a stack pointer register 118) may be incremented or decremented to point to a desired element of the stack.

In certain examples, a shadow stack 154 is used, for example, in addition to a (e.g., separate) stack 152 (e.g., as discussed herein). In one example, the term shadow stack may generally refer to a stack to store control information, e.g., information that can affect program control flow or transfer (e.g., return addresses and (e.g., non-capability) data values). In one example, a shadow stack 154 stores control information (e.g., pointer(s) or other address(es)) for a thread, for example, and a (e.g., data) stack may store other data, for example, (e.g., local) variables and/or bookkeeping data for a thread.

In certain examples, one or more shadow stacks 154 are included and used to protect an apparatus and/or method from tampering and/or increase security. The shadow stack(s) (e.g., shadow stack 154 in FIG. 1) may represent one or more additional stack type of data structures that are separate from the stack (e.g., stack 152 in FIG. 1). In one example, the shadow stack (or shadow stacks) is used to store control information, such as a copy of the return address stored to the stack on a CALL instruction, but not data (e.g., not parameters and other data of the type stored on the stack, e.g., that user-level application programs are to write and/or modify). In one example, the control information stored on the shadow stack (or stacks) is return address related information (e.g., actual return address, information to validate return address, and/or other return address information), to be verified by a RET/Return instruction (e.g., to verify the return address stored on the shadow stack matches the return address from the program stack). In one example, the shadow stack is used to store a copy of each return address for a thread, e.g., a return address corresponding to a thread whose context or other data has been previously pushed on the (e.g., data) stack. For example, when functions or procedures have been called, a copy of a return address for the caller may have been pushed onto the shadow stack. The return information may be a shadow stack pointer (SSP) 116, e.g., that identifies the most recent element (e.g., top) of the shadow stack. In certain examples, the shadow stack 154 may be read and/or written to in user level mode (for example, current privilege level (CPL) equal to three, e.g., a lowest level of privilege) or in a supervisor privilege level mode (for example, a current privilege level (CPL) less than three, e.g., a higher level of privilege than CPL=3). In one example, multiple shadow stacks may be included, but only one shadow stack (e.g., per logical processor) at a time may be allowed to be the current shadow stack. In certain examples, there is a (e.g., one) register of the processor to store the (e.g., current) shadow stack pointer 116.

In certain examples, the shadow stack (e.g., capability) register 116 stores a capability (e.g., a pointer with security metadata) that indicates the (e.g., address of the) corresponding element in (e.g., the top of) the shadow stack 154 in memory 134. In certain examples, the stack pointer register 118 stores a capability (e.g., a pointer with security metadata) that indicates the (e.g., address of the) corresponding element in (e.g., the top of) the stack 152 in memory 134.

In certain examples, the data capability register(s) 120 stores a capability (e.g., a pointer with security metadata) that indicates the (e.g., address of the) corresponding data in memory 134 (e.g., data that is protected by the capability).

In certain examples, the thread-local storage capability register(s) 122 stores a capability (e.g., a pointer with security metadata) that indicates the (e.g., address of the) corresponding thread-local storage in memory 134 (e.g., thread-local storage that is protected by the capability). In certain examples, thread-local storage (TLS) is a mechanism by which variables are allocated such that there is one instance of the variable per extant thread, e.g., using static or global memory local to a thread.

In certain examples, the code capability register(s) 124 stores a capability (e.g., a pointer with security metadata) that indicates the (e.g., address of the) corresponding code (e.g., block of instructions) in memory 134 (e.g., code that is protected by the capability).

In certain examples, the general purpose (e.g., data) register(s) 126 are to store values (e.g., data). In certain examples, the general purpose (e.g., data) register(s) 126 are not protected by a capability (e.g., but they can be used to store a capability). In certain examples, general purpose (e.g., data) register(s) 126 (e.g., 64-bits wide) includes registers RAX, RBX, RCX, RDX, RBP, RSI, RDI, RSP, and R8 through R15.

In certain examples, the special purpose (e.g., data) register(s) 128 are to store values (e.g., data). In certain examples, the special purpose (e.g., data) register(s) 128 are not protected by a capability (e.g., but they may in some examples be used to store a capability). In certain examples, special purpose (e.g., data) register(s) 128 include one or any combination of floating-point data registers (e.g., to store floating-point formatted data), vector (e.g., Advanced Vector eXtension (AVX)) registers, two-dimensional matrix (e.g., Advanced Matrix eXtension (AMX)) registers, etc.

In certain examples, register(s) 114 includes register(s) dedicated only for capabilities, e.g., registers CAX, CBX, CCX, CDX, etc.).

Hardware processor 100 includes a coupling (e.g., connection) to memory 134. In certain examples, memory 134 is a memory local to the hardware processor (e.g., system memory). In certain examples, memory 134 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Hardware processor 100 includes a memory management circuit 130, for example, to control access (e.g., by the execution unit 106) to the (e.g., addressable memory 136 of) memory 134. Hardware processor 100 (e.g., memory management circuit 130) may include an encryption/decryption circuit 132, for example, the encrypt or decrypt data for memory 134.

Memory 134 may include virtual machine monitor code 150. In certain examples of computing, a virtual machine (VM) is an emulation of a computer system. In certain examples, VMs are based on a specific computer architecture and provide the functionality of an underlying physical computer system. Their implementations may involve specialized hardware, firmware, software, or a combination. In certain examples, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (I/O) resources, such as, but not limited to, memory management circuit 130. The VMM may provide a centralized interface for managing the entire operation, status, and availability of VMs that are installed over a single host machine or spread across different and interconnected hosts.

Certain examples herein utilize a compartment descriptor 140 containing capabilities that point to one or more state elements (e.g., and data and/or instructions) in its respective compartment 142. In certain examples, hardware processor 100 uses a compartmentalization architecture, e.g., with a corresponding compartment identifier ("CID") for each compartment 142. In certain examples, the CID value is programmed into a specified (e.g., control) register of a processor core. In certain examples, a CID is a 16-bit identifier, although any number of bits may be used (e.g., 8 bits, 32 bits, 64 bits, etc.). In certain examples, the CID uniquely identifies a compartment 142, allowing (e.g., 64 k) compartments 142 to be allocated in a single process address space of addressable memory 136. In certain examples, all accesses are tagged if compartmentalization is enabled and the tag for an access must match the current (e.g., active) compartment identifier programmed in the (e.g., control) register of the register(s) 114 of the processor (e.g., a portion of the tag must be the CID value).

In certain examples, each compartment 142 includes multiple items (e.g., categories) of information, e.g., multiple state elements. In certain examples, each item of information within a single compartment 142, e.g., each state element within a single compartment 142, includes a respective capability (e.g., address and security metadata) to that stored information.

In certain examples, each compartment 142 has a respective compartment descriptor 140, for example, storing one or more capabilities for a corresponding one or more items of information stored within a single compartment 142. In certain examples, each compartment descriptor 140 is stored in memory (e.g., not in a register or in a register) and includes a pointer 112 (or capability) to that compartment descriptor 140. Example formats of compartments and their respective compartment descriptors are discussed below in reference to FIG. 3.

In certain examples, utilizing a compartment includes switching from a first compartment (whose elements (e.g., state elements) are within or identified by the registers 114 of a processor 100 (e.g., core)) to a second compartment (e.g., whose elements are within memory 134 or are identified with memory 134 and are to be loaded into the registers 114 of the processor 100 (e.g., core)).

In certain examples, an instruction is to load a capability, store a capability, and/or switch between capabilities (e.g., switch an active first capability to being inactive and switch an inactive second capability to being active) in the hardware processor 100, e.g., via capability management circuit 108 using capability-based access control for enforcing memory safety, e.g., and low-overhead compartmentalization. In certain examples, hardware processor 100 (e.g., the decoder circuit 104 and/or the execution circuit 106 thereof) executes a single instruction to (i) save capabilities to elements (e.g., including state elements) from registers 114 (e.g., the content of any one or combination of the registers 114) into a compartment descriptor 140 for a compartment 142 thereof and/or (ii) load capabilities to elements (e.g., including state elements) from a compartment descriptor 140 for a compartment 142 into registers 114 (e.g., any one or combination of the registers 114). In certain examples, the elements include state elements, data elements, and/or code elements. In certain examples, the elements are identified by a respective capability, e.g., stored in a corresponding compartment descriptor 140.

In certain examples, hardware processor 100 (e.g., the decoder circuit 104 and/or the execution circuit 106 thereof) execute a single user level instruction (e.g., accessible in user space) to save and/or load capabilities to state elements (for example, state elements that are not only data elements, e.g., not only values from data registers and/or control registers). Certain instructions herein utilize a compartment descriptor 140 to save and/or load capabilities to state elements (for example, state elements that are not only data elements, e.g., not only values from data registers and/or control registers). Certain instructions herein utilize a compartment descriptor 140 and its busy flag (e.g., as shown in FIG. 3) to save and/or load capabilities to state elements (for example, state elements that are not only data elements, e.g., not only values from data registers and/or control registers) in/from a compartment, e.g., of multiple compartments that share an address space. Certain instructions herein implement a consistency (e.g., security) check by capability management circuit 108 in the saving and/or loading of capabilities to state elements (for example, state elements that are not only data elements, e.g., not only values from data registers and/or control registers). Certain instructions herein implement a capability check by capability management circuit 108 in the saving and/or loading of capabilities to state elements (for example, state elements that are not only data elements, e.g., not only values from data registers and/or control registers).

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata (e.g., that is compressed in order to fit) in the remaining (e.g., 32 or 64)

bits of the capability. In certain examples, each capability includes (or is associated with) a (e.g., 1-bit) validity "tag" whose value is maintained in registers and memory (e.g., in tags 146) by the architecture (e.g., by capability management circuit 108). In certain examples, each element of the capability contributes to the protection model and is enforced by hardware (e.g., capability management circuit 108).

In certain examples, when stored in memory, valid capabilities are to be naturally aligned (e.g., at 64-bit or 128-bit boundaries) depending on capability size where that is the granularity at which in-memory tags are maintained. In certain examples, partial or complete overwrites with data, rather than a complete overwrite with a valid capability, lead to the in-memory tag being cleared, preventing corrupted capabilities from later being dereferenced. In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

FIG. 2A illustrates an example format of a capability 110 including a validity tag 110A field, a bounds 110B field, and an address 110C (e.g., virtual address) field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for example, for memory access), and/or the address 110C is the memory address storing the corresponding data (or instructions) protected by the capability.

FIG. 2B illustrates an example format of a capability 110 including a validity tag 110A field, a permission(s) 110D field, an object type 110E field, a bounds 110B field, and an address 110C field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space (e.g., the range) to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization.

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

In certain examples, a capability is an individually revocable capability (IRC). In certain examples, each address space has capability tables for storing a capability associated with each memory allocation, and each pointer to that allocation contains a field (e.g., table index) referencing the corresponding table entry (e.g., a tag in that entry). In certain embodiments, IRC deterministically mitigates spatial vulnerabilities.

In certain examples, a compartment descriptor format for a capability (CAP) includes one or more of: (i) a capability table (CAP TAB) address, (ii) CAP CURSOR capability table entry index, (iii) default data capability (DDC) capability table entry index, (iv) current code capability (CCC) capability table entry index, (v) instruction pointer (e.g., RIP), (vi) stack pointer (e.g., RSP), and/or (vii) busy flag to block re-entry into an active compartment.

In certain examples, the format of a capability (for example, as a pointer that has been extended with security metadata, e.g., bounds, permissions, and/or type information) overflows the available bits in a pointer (e.g., 64-bit) format. In certain examples, to support storing capabilities in a general-purpose register file without expanding the registers, examples herein logically combine multiple registers (e.g., four for a 256-bit capability) so that the capability can be split across those multiple underlying registers, e.g., such that general purpose registers of a narrower size can be utilized with the wider format of a capability as compared to a (e.g., narrower sized) pointer.

FIG. 3 illustrates a memory 134 having a first compartment "–1" in compartments 301, a first compartment descriptor 300-1 for the first compartment, a second compartment "–2" in compartments 301, and a second compartment descriptor 300-2 for the second compartment according to examples of the disclosure.

In certain examples, compartments 301 is an instance of compartments 142 in FIG. 1. In certain examples, compartment descriptors 300-1 and 300-2 are instances of a compartment descriptor 140 in FIG. 1.

In FIG. 3, first compartment "–1" in compartments 301 is logically separate from the second (or other) compartments, e.g., such that the first compartment is not accessible by the second (or other) compartments and the second compartment is not accessible by the first (or other) compartments.

First compartment descriptor 300-1 includes any one or combination of: (i) shadow stack capability 302-1 that indicates (e.g., points to) the shadow stack element(s) 318-1 stored in the first compartment (e.g., with the shadow stack element(s) being those elements to and/or from the shadow stack pointer (e.g., capability) register(s) 116 in FIG. 1), (ii) stack capability 304-1 that indicates (e.g., points to) the stack element(s) 320-1 stored in the first compartment (e.g., with the stack element(s) being those elements to and/or from the stack pointer (e.g., capability) register(s) 118 in FIG. 1), (iii) data capability 306-1 that indicates (e.g., points to) the data element(s) 322-1 stored in the first compartment (e.g., with the data element(s) being those elements to and/or from the data capability register(s) 120 in FIG. 1), (iv) thread-local storage capability 308-1 that indicates (e.g., points to) the thread-local storage element(s) 324-1 stored in the first compartment (e.g., with the thread-local storage element(s) being those elements to and/or from the thread-local storage capability register(s) 122 in FIG. 1), (v) code capability 310-1 that indicates (e.g., points to) the code element(s) 326-1 stored in the first compartment (e.g., with the code element(s) being those elements to and/or from the code capability register(s) 124 in FIG. 1), or (vi) data registers 312-1 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

Second compartment descriptor 300-2 includes any one or combination of: (i) shadow stack capability 302-2 that indicates (e.g., points to) the shadow stack element(s) 318-2 stored in the second compartment (e.g., with the shadow stack element(s) being those elements to and/or from the shadow stack pointer (e.g., capability) register(s) 116 in FIG. 1), (ii) stack capability 304-2 that indicates (e.g., points to) the stack element(s) 320-2 stored in the second compartment (e.g., with the stack element(s) being those elements to and/or from the stack pointer (e.g., capability) register(s) 118 in FIG. 1), (iii) data capability 306-2 that indicates (e.g., points to) the data element(s) 322-2 stored in the second compartment (e.g., with the data element(s) being those elements to and/or from the data capability register(s) 120 in FIG. 1), (iv) thread-local storage capability 308-2 that indicates (e.g., points to) the thread-local storage element(s) 324-2 stored in the second compartment (e.g., with the thread-local storage element(s) being those elements to and/or from the thread-local storage capability register(s) 122 in FIG. 1), (v) code capability 310-2 that indicates (e.g., points to) the code element(s) 326-2 stored in the second compartment (e.g., with the code element(s) being those elements to and/or from the code capability register(s) 124 in FIG. 1), or (vi) data registers 312-2 that stores the data element(s) from the register(s) for that compartment (e.g., with the data element(s) being those elements to and/or from the general purpose (e.g., data) register(s) 126 and/or special purpose (e.g., data) register(s) 128 in FIG. 1).

In certain examples, a processor (e.g., physical core or logical core) is to switch (e.g., where only one compartment is to be active at any given time) between compartments, e.g., when executing that compartment's code on that compartment's data according to that compartment's state element(s). For a request to switch from compartment 1 to compartment 2, in certain examples, processor (e.g., processor 100 in FIG. 1) is to (e.g., in response to execution of a single instruction) populate compartment 1 descriptor 300-1 from the register(s) (e.g., register(s) 114 in FIG. 1) and the corresponding elements into compartment 1 in compartments 301, and then populate the elements indicated by the compartment 2 descriptor 300-2 into the register(s) (e.g., register(s) 114 in FIG. 1) from the compartment 2 descriptor 300-2 and/or the corresponding elements from compartment 2 in compartments 301, and vice-versa to switch from compartment 2 to compartment 1.

In certain examples, each descriptor includes a busy flag to help avoid corrupting a descriptor that already contains saved elements (e.g., saved state) and/or to avoid loading from an empty descriptor. In certain examples, first compartment descriptor 300-1 includes a descriptor busy flag 316-1, e.g., that when set, indicates to the processor that the first compartment is active in the processor (e.g., core), e.g., the registers are loaded for use in executing code of that first compartment, and/or second compartment descriptor 300-2 includes a descriptor busy flag 316-2, e.g., that when set, indicates to the processor that the second compartment is active in the processor (e.g., core), e.g., the registers are loaded for use in executing code of that second compartment.

In certain examples, only a single busy flag is to be active (e.g., set to a first "active" value (e.g., 1) from a second "inactive" value (e.g., 0)) at any time (e.g., only one busy flag is to be active in one thread). In certain examples, a processor is to set the busy flag when a load of elements into the register(s) from a compartment descriptor (e.g., and its compartment) is complete, e.g., and cleared when a store of elements from the register(s) into the compartment descriptor (e.g., and its compartment) is begun or complete.

In certain examples, each descriptor includes an indication of (e.g., a bitmap that indicates) which registers (e.g., data registers) are to be saved and/or restored, for example, indicating a proper subset of the registers whose content is to be saved into memory (e.g., into a compartment descriptor and/or compartment) and/or restoring their content from memory (e.g., from a compartment descriptor and/or compartment) into the proper subset of the registers, since automatically saving and/or restoring all registers could introduce significant, unnecessary overhead. In certain examples, first compartment descriptor 300-1 includes a data register bitmap 314-1, for example, that when a corresponding bit for each register of a plurality of registers is set, indicates to the processor (i) which register(s) are to have their content saved into memory (e.g., into a compartment descriptor and/or compartment) and/or (ii) which register(s) are to have their content restored from memory (e.g., from a compartment descriptor and/or compartment). In one example, a bitmap indicates (i) which of a plurality of general purpose (e.g., data) registers 126 and/or which of a plurality of special purpose (e.g., data) register(s) 128 in FIG. 1 are to have their content saved into memory (e.g., into a compartment descriptor and/or compartment) and/or (ii) which of a plurality of general purpose (e.g., data) registers 126 and/or which of a plurality of special purpose (e.g., data) register(s) 128 in Figure are to have their content restored from memory (e.g., from a compartment descriptor and/or compartment). In certain examples, a compartment ID is additionally specified in each compartment descriptor, and a register to specify the current compartment ID is loaded with the compartment ID value from the descriptor being loaded when entering a compartment.

In certain examples, one or more (e.g., each capability) within a descriptor is individually tagged to avoid capability forgery, but that may still leave saved data registers potentially vulnerable. Instead, in certain examples, access to the descriptor could be limited to require a valid capability to the descriptor itself (e.g., as a capability to access one or more other capabilities in a descriptor). In certain examples, the capability to the descriptor is marked as such, e.g., so that arbitrary reads and writes are not permitted to the descriptor, and (e.g., only) complete save and/or restore operations are permitted to the descriptor.

In certain examples, descriptors are encrypted (e.g., by encryption/decryption circuit 132 in FIG. 1) so that even if unauthorized access is provided to the memory containing the descriptor, the adversary will not be able to access (e.g., disclose or corrupt)) plaintext capabilities and/or register contents. In certain examples, capabilities themselves are encrypted to mitigate forgery and corruption attempts, which may obviate the need for a validity tag. In certain examples, each capability may span multiple registers.

The technology described herein builds on capability-based access control. In one implementation, a computing system includes capability hardware enhanced reduced instruction set computing (RISC) instructions (CHERI) and a CHERI instruction set architecture (ISA). Briefly, the CHERI capability architecture replaces pointers with 128-bit capabilities that specify bounds and other metadata in addition to addresses. CHERI defines registers containing capabilities to be used when accessing the stack 152 or data, among other capabilities.

The stack capability 118 can be configured to cover the stack region so that authorized accesses to the stack 152 may be performed. The default data capability 120 may be configured to not overlap the stack region so that ordinary data accesses cannot access the stack 152. This protects the stack contents from being disclosed or corrupted by an untrusted compartment. This avoids the need for expensive stack switches in compartmentalized software models that synchronously invoke one compartment from another.

Figure 4:
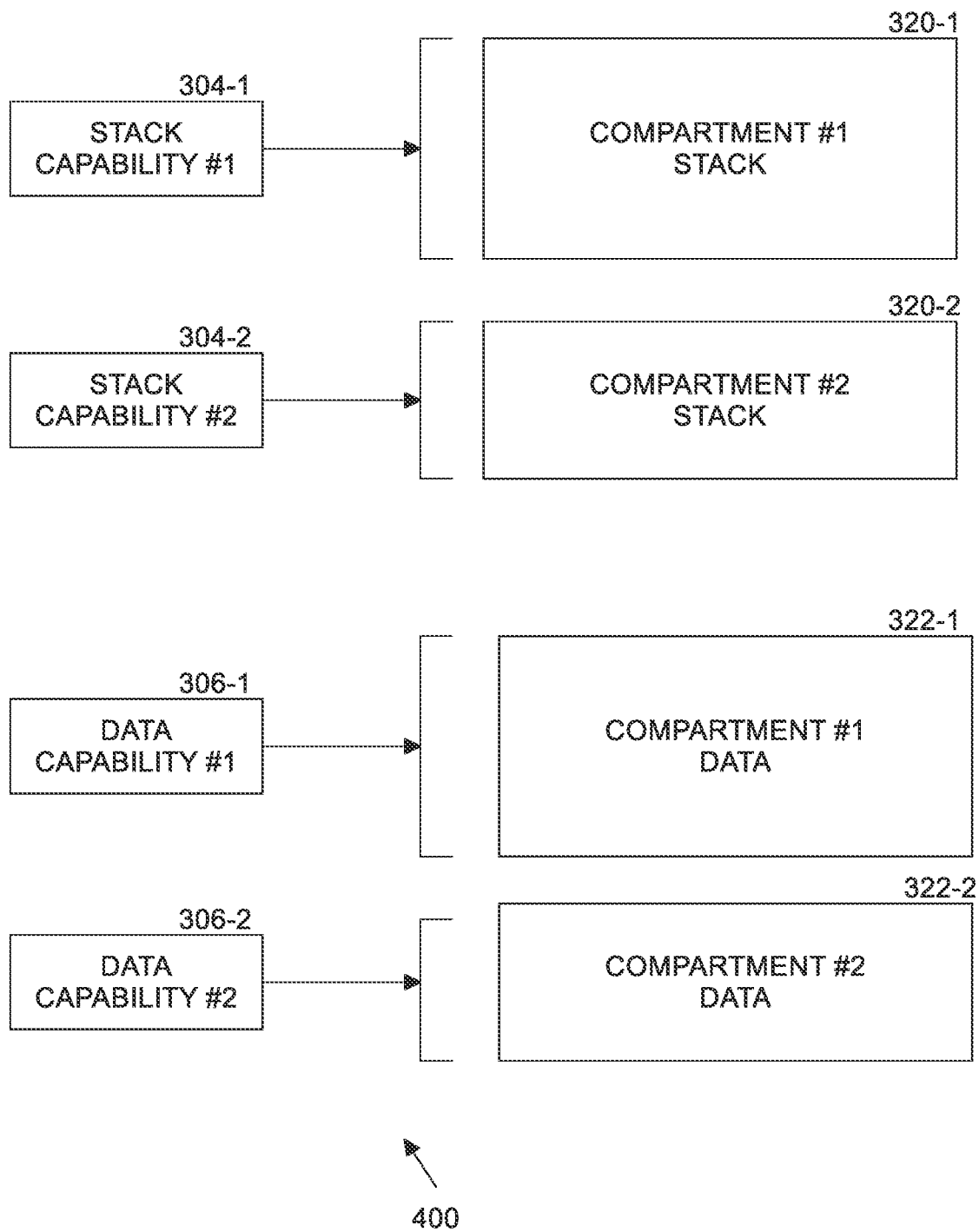
FIG. 4 illustrates a first memory layout and capability configuration.

FIG. 4 illustrates a first memory layout and capability configuration 400. In this memory layout and configuration, there is a first stack for a first compartment (e.g., compartment #1 stack 320-1 referenced by a first stack capability (stack capability #1 304-1), and a second stack for a second compartment (e.g., compartment #2 stack 320-2 referenced by a second stack capability (stack capability #2 304-2). Similarly, there is a data region of a first compartment (e.g., compartment #1 data 322-1 referenced by a first data capability (data capability #1 306-1), and a data region of a second compartment (e.g., compartment #2 322-2 referenced by a second data capability (data capability #2 306-2). In this memory layout and configuration, hardware processor 100 switches between the two compartments as needed.

Figure 5:
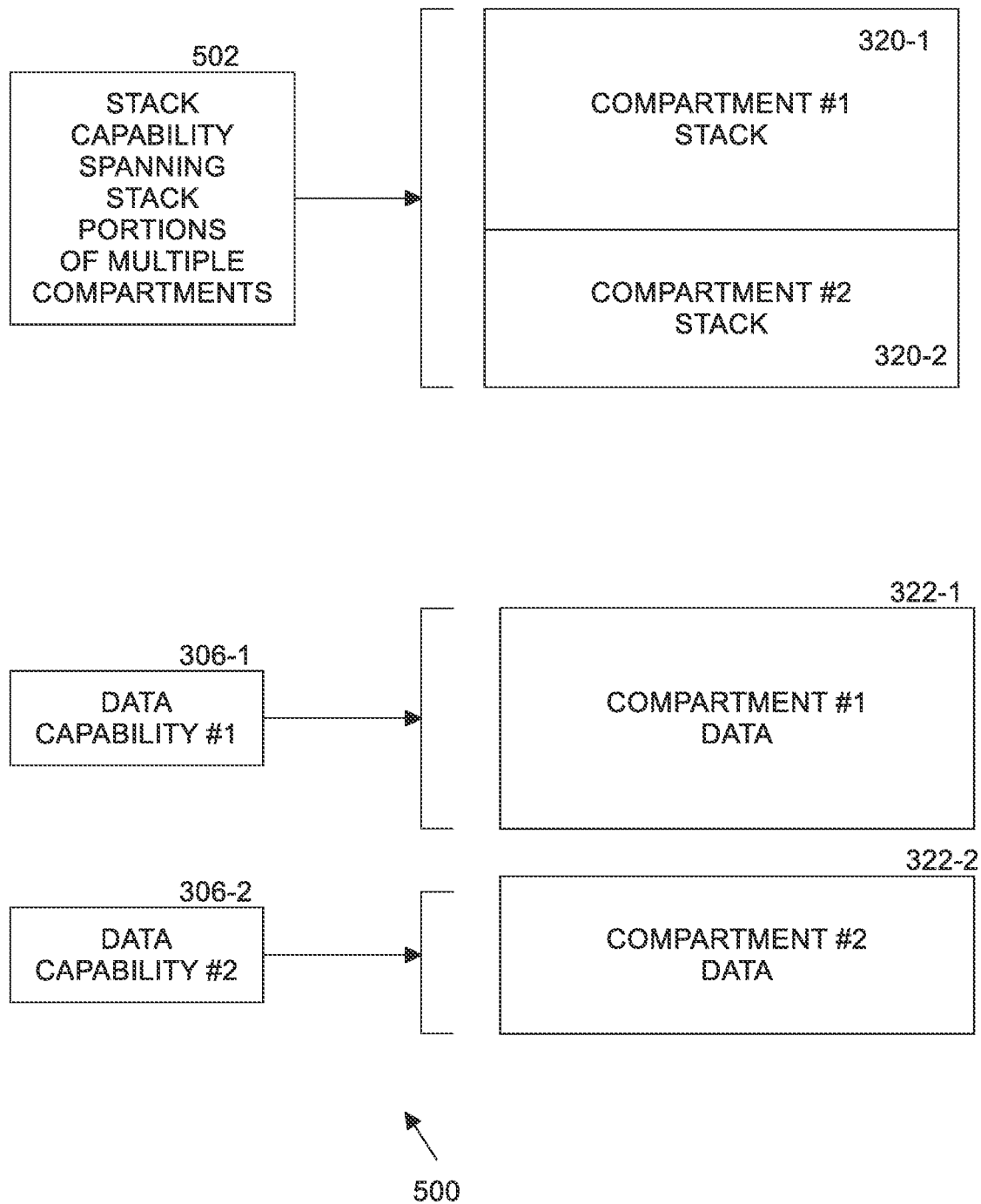
FIG. 5 illustrates a second memory layout and capability configuration according to examples of the disclosure.

In contrast, FIG. 5 illustrates a second memory layout and capability configuration 500 according to examples of the disclosure. In this memory layout and configuration, a single stack capability spanning stack portions of multiple compartments 502 references both compartment #1 stack 320-1 and compartment #2 stack 320-2, in this example.

Instruction encodings for memory accesses can indicate whether accesses are intended for the stack (e.g., compartment #1 stack 320-1 or compartment #2 stack 320-2) or the default data region (e.g., compartment #1 data 322-1 or compartment #2 data 322-2), and the appropriate capability can hence be selected for checking each access. For example, a compiler can perform static analysis of each memory access that is authorized to reference the stack 152 to verify that the access is safe, e.g., free of memory safety violations. The compiler can change how memory is allocated so that any allocations that would otherwise be placed on the stack, but for which the compiler is unable to verify that all accesses to them are safe, are instead moved to a heap. That leaves only "safe" accesses referencing the stack 152, hence obviating the need for using separate stacks and stack capabilities to isolate stacks, at least in certain threat models. Instead, in the technology described herein, the same stack and corresponding capability may be used to cover multiple stack portions for different compartments. Even if some other instruction is passed a pointer to the stack, the access will be restricted by the default data capability and hence be blocked from being used to access the stack. In either case, it is still useful to switch the default data capability setting when switching between compartments so that data accesses are blocked from accessing a default data region belonging to another compartment.

Figure 6:
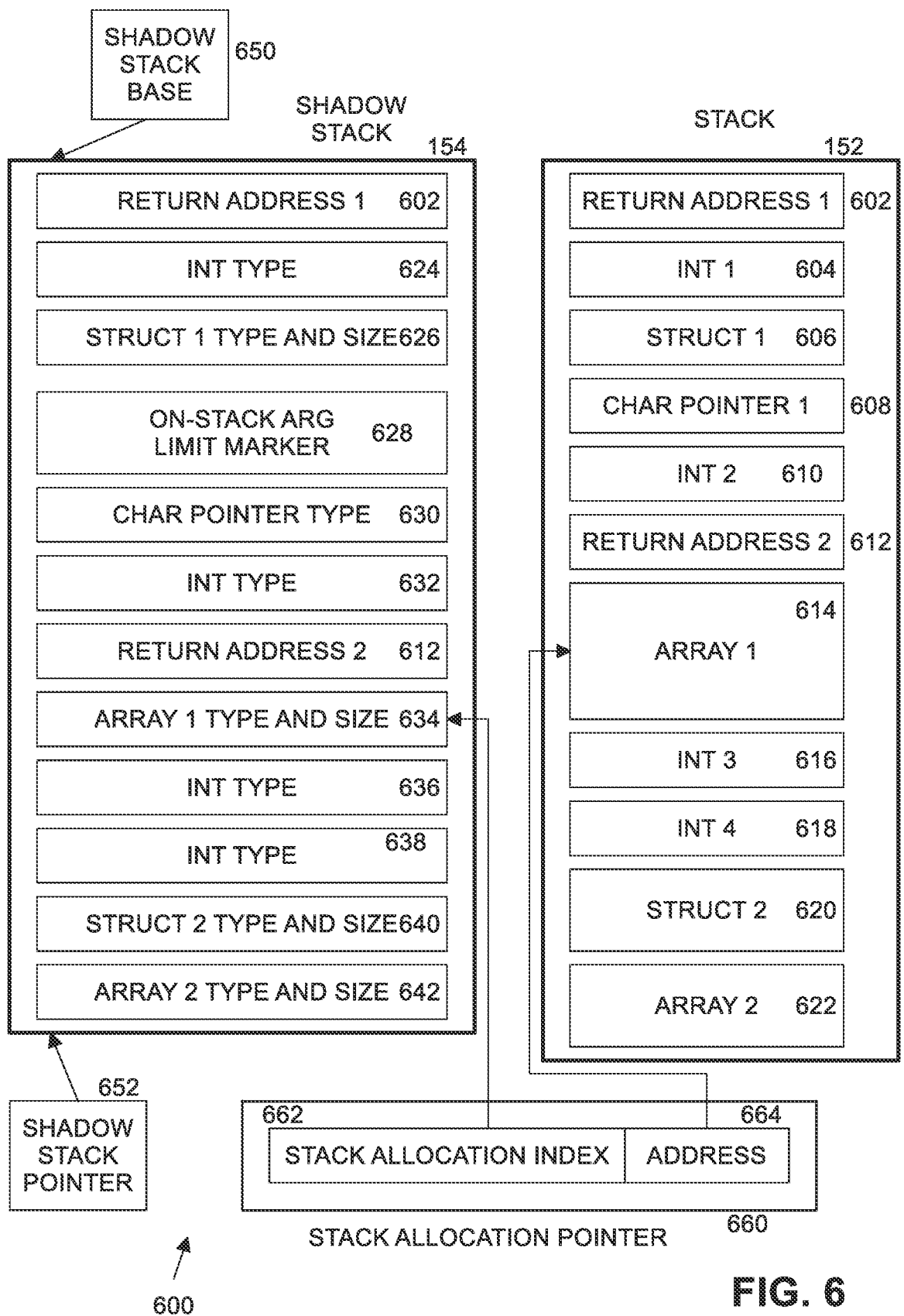
FIG. 6 illustrates a stack and a shadow stack according to examples of the disclosure.

In one implementation, per-allocation type and bounds information may be stored on the shadow stack 154. Shadow stack 154 may be stored in protected memory. The shadow stack 154 can also be covered separately by a different capability. Furthermore, the shadow stack 154 can contain capability information for variables on the stack 152. This provides for the enforcement of stack memory safety without requiring a capability to be passed explicitly to each stack access instruction, since an ordinary stack access instruction can look up capability information from the corresponding shadow stack location. For example, consider the information that can be encoded in the shadow stack for a corresponding data stack layout as shown in FIG. 6.

In this example, stack 152 includes information from a first function call, the information comprising return address 1 602, and local variables for the first function: an integer INT 1 604 and a structure object STRUCT 1 606, and on-stack arguments: a character pointer CHAR POINTER 1 608, and another integer object INT 2 610. Stack 152 also includes information from a second function call, the information comprising return address 2 612, and local variables for the second function (but no on-stack arguments in this example): an array object ARRAY 1 614, an integer object INT 3 616, another integer object INT 4 618, a structure object STRUCT 2 620, and another array object ARRAY 2 622.

According to one implementation, shadow stack 154 may be encoded by hardware processor 100 to include return address 1 602 of the first function call, but also metadata associated with the types of local variables for the first function call, such as INT type 624, STRUCT 1 type and size 626, CHAR POINTER type 630 and INT type 632. Similarly, shadow stack 154 may be encoded with return address 2 612, and metadata associated with the types of local variables for the second function call, such as ARRAY 1 type and size 634, INT type 636, INT type 638, STRUCT 2 type and size 640, and ARRAY 2 type and size 642.

Additionally, the metadata on the shadow stack associated with the first function call also includes an on-stack argument (ARG) limit marker 628. On-stack ARG limit marker 628 is used to demarcate the on-stack arguments separately from the local variables in the stack frame. The processor uses this to restrict accesses from the callee relative to the stack pointer to just the on-stack arguments. The caller may still pass references to local variables to its callee as capabilities that are distinct from the stack capability.

Shadow stack 154 may be referenced at the beginning (e.g., bottom) of the shadow stack by shadow stack base 650 and at the top of the stack by shadow stack pointer 652 (e.g., an instance of shadow stack pointer 116).

To locate type and bounds metadata for a specified allocation of an object in memory, the technology described herein generates a pointer called a stack allocation pointer 660. In one implementation, the bounds may be computed based on a stack frame base being specified in the shadow stack and the size of each stack allocation being recorded in the shadow stack. In one implementation, stack allocation pointer 660 includes stack allocation index 662 and address 664. The stack allocation index 662 references a location in shadow stack 154 and address 664 references a location in stack 152. The stack allocation pointer 660 specifies the stack allocation index 662 relative to the shadow stack base 650. Every shadow stack entry has an identical size, so a sequential allocation index is adequate for locating any particular entry, and the stack allocation index is usable even when passed to a callee. Pointer tagging (as described in US Patent Publication No. US20200125770A1, entitled "Data Encryption Based on Immutable Pointers", filed Jun. 29, 2019, and hereby incorporated by reference) or encryption (as described in US Patent Publication No. US20200125501A1, entitled "Pointer Based Data Encryption", filed Jun. 29, 2019, and hereby incorporated by reference) could optionally be used to protect the stack allocation pointer and to prevent the stack allocation index 662 from unauthorized modifications while still allowing the address 664 to be modified as well as to identify the stack allocation pointer 660 as being in this format. As an alternative to encoding the stack allocation index 662 in stack allocation pointer 660, the processor may automatically derive the corresponding stack allocation index based on the current address in the pointer and only allow authorized instructions to modify the address in the pointer. In that way, the processor can prevent the address from exiting the authorized stack allocation and hence preserve its ability to locate the corresponding stack allocation index from the address in the pointer. For example, the processor could locate the most recent return address in the shadow stack and compute the bounds for a sufficient number of allocations in the current stack frame as well as any on-stack arguments to be able to identify which bounds cover the current address value in the pointer. Addresses may be derived specially from the stack pointer register, since software needs to be able to reference any stack allocation in the current stack frame as well as any on-stack arguments immediately above it. For example, the instruction encoding may indicate whether the stack pointer register is an operand in an instruction to compute a stack address. If so, that instruction may permit the address to be updated to point anywhere in the current stack frame or any on-stack arguments rather than restricting it to just the most recent stack allocation. This can apply even to transitory stack pointers generated in memory operands relative to the stack pointer.

When an access to the stack is attempted via a stack allocation pointer 660, the processor 100 first looks up the metadata identified by the stack allocation pointer. Specifically, the processor computes an address of the metadata by subtracting the stack allocation index 662 scaled by the size of each shadow stack entry from the shadow stack base 650 address, e.g., as read from a Model-Specific Register (MSR) and loads the metadata from that location in the shadow stack.

The metadata may specify the bounds of the corresponding stack allocation directly (e.g., inside of each shadow stack entry. Each entry needs to be large enough to fit the bounds. For example, shadow stack entries may be 128 bits or 256 bits).

If so, the address 664 in the stack allocation pointer 660 is checked to see whether the address is within those bounds. If not, an exception is generated.

Other implementations may include alternative ways of computing data bounds that are more compact. For example, the return address shadow stack entry (such as return address 1 602 or return address 2 612) may be augmented to also specify the corresponding stack frame base address. As used herein, a stack frame is the range of stack memory containing all of the stack allocations associated with a particular activation of a function, e.g., the return address, saved register values, and local variables. For example, 602-610 comprise one frame, and 612-622 comprise a second frame.

When accessing a stack allocation, the processor 100 may locate that base address specified by walking the shadow stack 154 and adding up the sizes of all allocations between the specified allocation and the stack frame base. That may permit the processor to compute the precise bounds of the specified allocation.

The stack allocation metadata may specify an allocation type. That may be adequate for computing relative bounds for types with well-known sizes. Other types, such as user-defined structs, may need to have their sizes specified explicitly in the associated shadow stack entries. Array types may also be represented. In one implementation, setting a bit in the metadata indicates that the specified type is for the element of an array. The total size of the array can be specified in the metadata. The implicit expected type for an access may be computed from the instruction type used for the access as described in US Patent Publication No. US20210150040A1, entitled "Data Type Based Cryptographic Computing", filed Dec. 26, 2020, and hereby incorporated by reference. Alternatively, an explicit type can be encoded, or distinct type-checking instructions can be used, for example, as described in U.S. patent application Ser. No. 17/561,817, entitled "Typed Store Buffers for Hardening Store Forwarding", filed Dec. 24, 2021, and hereby incorporated by reference.

Figure 7:
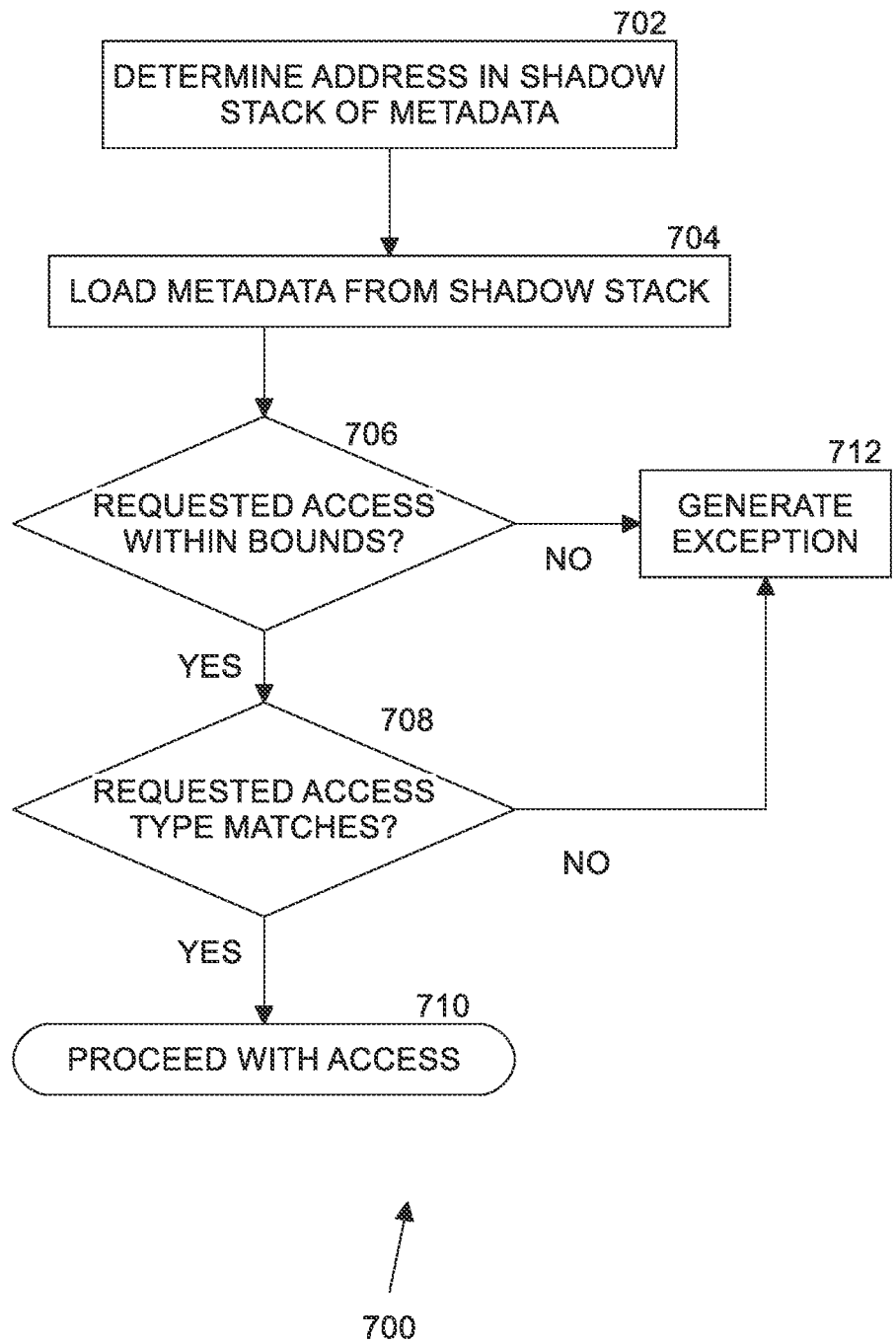
FIG. 7 illustrates operations of a method of accessing a stack allocation pointer according to examples of the disclosure.

FIG. 7 illustrates operations of a method 700 of accessing a stack allocation pointer 660 according to examples of the disclosure. In one implementation, these actions are performed by capability management circuit 108 when a memory access is requested to a data object (e.g., one of the local variables or on-stack arguments) in the stack 154. At block 702, processor 100 determines an address in shadow stack 154 of the metadata. Processor 100 computes the address into the shadow stack using shadow stack base 650 and stack allocation index 662. At block 702, processor 100 loads the metadata from the shadow stack.

The processor loads the metadata and processes the metadata internally, with no defined destination for the loaded data. The metadata is consumed by the processor. Every shadow stack entry may be of the same size or a variable size with the size known based on the type of the shadow stack entry, and that size or set of sizes may be defined by the particular shadow stack architecture (e.g., 64 bits for each entry in Control Flow Enforcement Technology (CET) implementations, which may be expanded to 128 bits or 256 bits to fit some of the types of metadata discussed above). Sometimes the processor loads multiple shadow stack items, e.g., to compute relative bounds based on the types and sizes specified for each stack allocation within the frame. Other than that, the index of the metadata to load is nominally specified by the stack allocation index 662.

At block 706, processor 100 determines if the requested access is within the bounds for the authorized stack allocation referenced by the supplied pointer as computed from the metadata on the shadow stack. If the requested access is within bounds, then processing continues with block 708, where the processor determines if an access type supplied by a type checking instruction or a memory access instruction, or implied by the memory access instruction, matches the reference type from the shadow stack. In one implementation, type checking may be performed as described in Tables 10 and 11 of U.S. Pat. No. 11,163,569 entitled "Hardware Apparatuses, Methods and Systems for Individually Revocable Capabilities for Enforcing Temporal Memory Safety" issued Nov. 2, 2021 and incorporated herein by reference. If the requested access type matches, then access proceeds at block 710. Otherwise, if the requested access is not within bounds or the requested access is not of the correct type, then an exception is generated at block 712.

In one implementation, a specialized instruction of the ISA of hardware processor 100 may be used to generate a stack allocation pointer that is tagged or encrypted. For example, such an instruction may be called Generate Stack Allocation Pointer (GenStackAllocPtr) and accept a stack allocation index 662 as an input operand. The GenStackAllocPtr instruction may generate a stack allocation pointer 660 referencing the supplied stack allocation index and the base address of the specified allocation of objects within the stack 152. Thus, the stack allocation pointer references an address in the stack and an address in the shadow stack. The GenStackAllocPtr instruction may first check that the specified allocation is within the current stack frame or a reachable on-stack argument or generate an exception otherwise.

The GenStackAllocPtr instruction may accept a relative stack allocation index 662 from the current stack frame base (e.g., the address where the return address for the current stack frame is stored), with positive indices, i.e., indices greater than zero, referencing on-stack arguments and negative indices, i.e., indices less than zero, referencing local allocations, or vice-versa, or an address of the allocation from which the global index can be derived by determining allocation bounds from the shadow stack entries and identifying which allocation that address falls within. It is useful to allow relative allocation indices to be specified for GenStackAllocPtr so that function code can reference the intended stack allocations for the current invocation of the function regardless of the absolute address of the stack pointer 118. For example, a single function may be invoked multiple times along a particular control flow, and a function may even invoke itself recursively. This will result in multiple stack frames being generated for that function with correspondingly different on-stack arguments, if any, being passed into each invocation of the function. Each time the GenStackAllocPtr instruction is invoked, the processor generates a stack allocation pointer 660 to the specified allocation or the on-stack arguments for the current function invocation. On the other hand, it may be useful for the generated stack allocation pointers to reference absolute allocation indices so that they are usable even if passed into callees, and perhaps even sub-callees.

Figure 8:
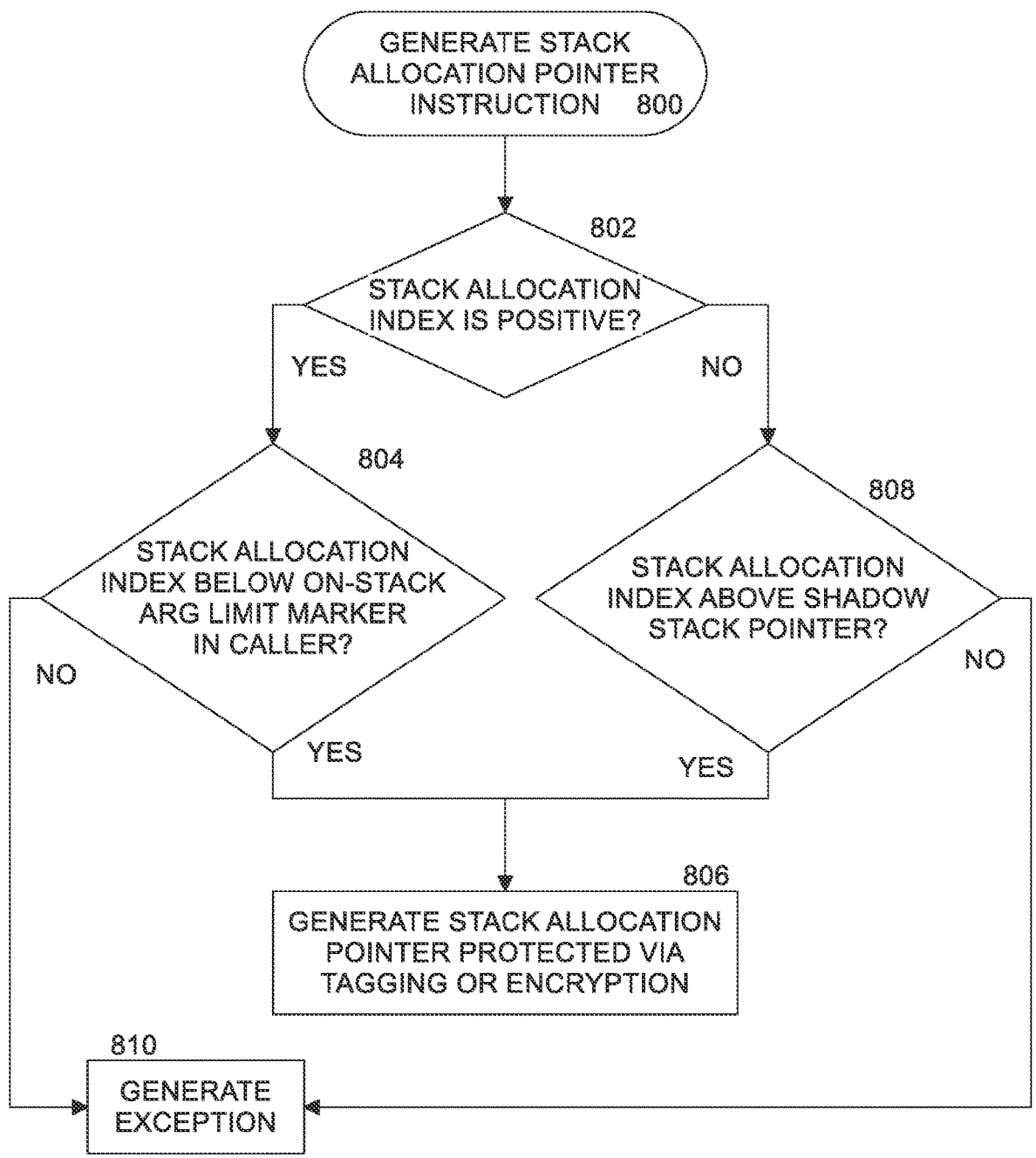
FIG. 8 illustrates operations of a method of processing a generate stack allocation pointer instruction according to examples of the disclosure.

FIG. 8 illustrates operations 800 of a method of generating a stack allocation pointer 660 according to examples of the disclosure, e.g., as caused by the execution of a single generate stack allocation pointer (GenStackAllocPtr) instruction. Some or all of the operations 800 (or other processes described herein, or variations, and/or combinations thereof) are performed under the control of a processor 100 (e.g., including a capability management circuit 108) as implemented herein and/or one or more computer systems configured with executable instruction(s) and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 800 are performed by a processor of the other figures.

At block 802, processor 100 determines if the stack allocation index 662 is positive, i.e., greater than zero, or otherwise refers to the on-stack argument region. If the stack allocation index is positive, then at block 804 the processor determines if the stack allocation index is below the on-stack arg limit marker 628 in the caller. If the stack allocation index 662 is below the on-stack arg limit marker 628, this means that the requested access is within the on-stack argument region that the callee is authorized to access and the processor generates the stack allocation pointer 660 at block 806. In one implementation, the stack allocation pointer is protected via tagging as described in US Patent Publication No. US20200125770A1, entitled "Data Encryption Based on Immutable Pointers". In another implementation, the stack allocation pointer is protected via encryption as described in US Patent Publication No. US20200125501A1, entitled "Pointer Based Data Encryption". Program execution then proceeds by the processor. If the stack allocation pointer is not positive at block 802, then the processor determines if the stack allocation pointer is above the shadow stack pointer 652. If so, processing continues with block 806. If the stack allocation index is not below the on-stack arg limit marker in the caller at block 804 or the stack allocation pointer is not above the shadow stack pointer 652 at block 808, then an exception is generated at block 810.

Figure 9:
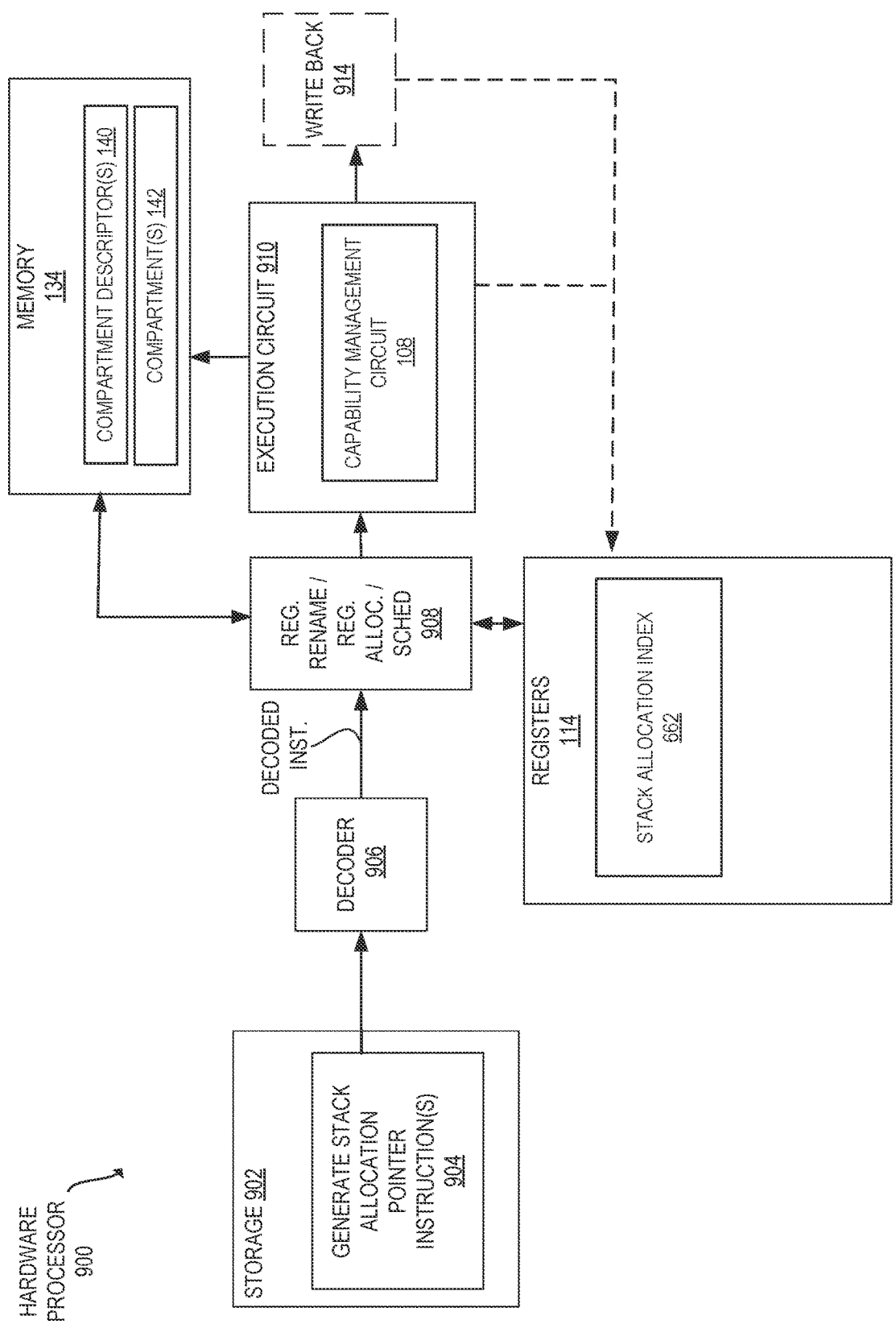
FIG. 9 illustrates a hardware processor coupled to storage that includes one or more generate stack allocation pointer instructions according to examples of the disclosure.

FIG. 9 illustrates a hardware processor 900 coupled to storage 902 that includes one or more generate stack allocation pointer instructions 904 according to examples of the disclosure. In certain examples, a generate stack allocation pointer instruction is according to any of the disclosure herein.

In certain examples, e.g., in response to a request to perform a generate stack allocation pointer operation, the instruction 904 (e.g., macro-instruction) is fetched from storage 902 and sent to decoder 906. In the depicted example, the decoder 906 (e.g., decoder circuit) decodes the instruction into a decoded instruction (e.g., one or more micro-instructions or micro-operations). The decoded instruction is then sent for execution, e.g., via scheduler circuit 908 to schedule the decoded instruction for execution.

In certain examples, (e.g., where the processor/core supports out-of-order (OoO) execution), the processor includes a register rename/allocator circuit 908 coupled to register file 114 (e.g., and memory 134) to allocate resources and perform register renaming on registers (e.g., registers associated with the initial sources and final destination of the instruction). In certain examples, (e.g., for out-of-order execution), the processor includes one or more scheduler circuits 908 coupled to the decoder 906. The scheduler circuit(s) may schedule one or more operations associated with decoded instructions, including one or more operations decoded from a switch compartment instruction 904, e.g., for execution on the execution circuit 910. In the depicted example, capability management circuit 108 is within the execution circuit 910.

As one example, a decoded generate stack allocation pointer instruction 904 is to cause a stack allocation pointer 660 to be generated based at least in part on stack allocation index 662. In certain examples, a write back circuit 914 is included to write back results of an instruction to a destination (e.g., write them to registers 912), for example, so those results are visible within a processor (e.g., visible outside of the execution circuit that produced those results).

One or more of these components (e.g., decoder 906, register rename/register allocator/scheduler 908, execution circuit 910, registers (e.g., register file) 912, memory 134, or write back circuit 914) may be in a single core of a hardware processor (e.g., and multiple cores each with an instance of these components).

Figure 10:
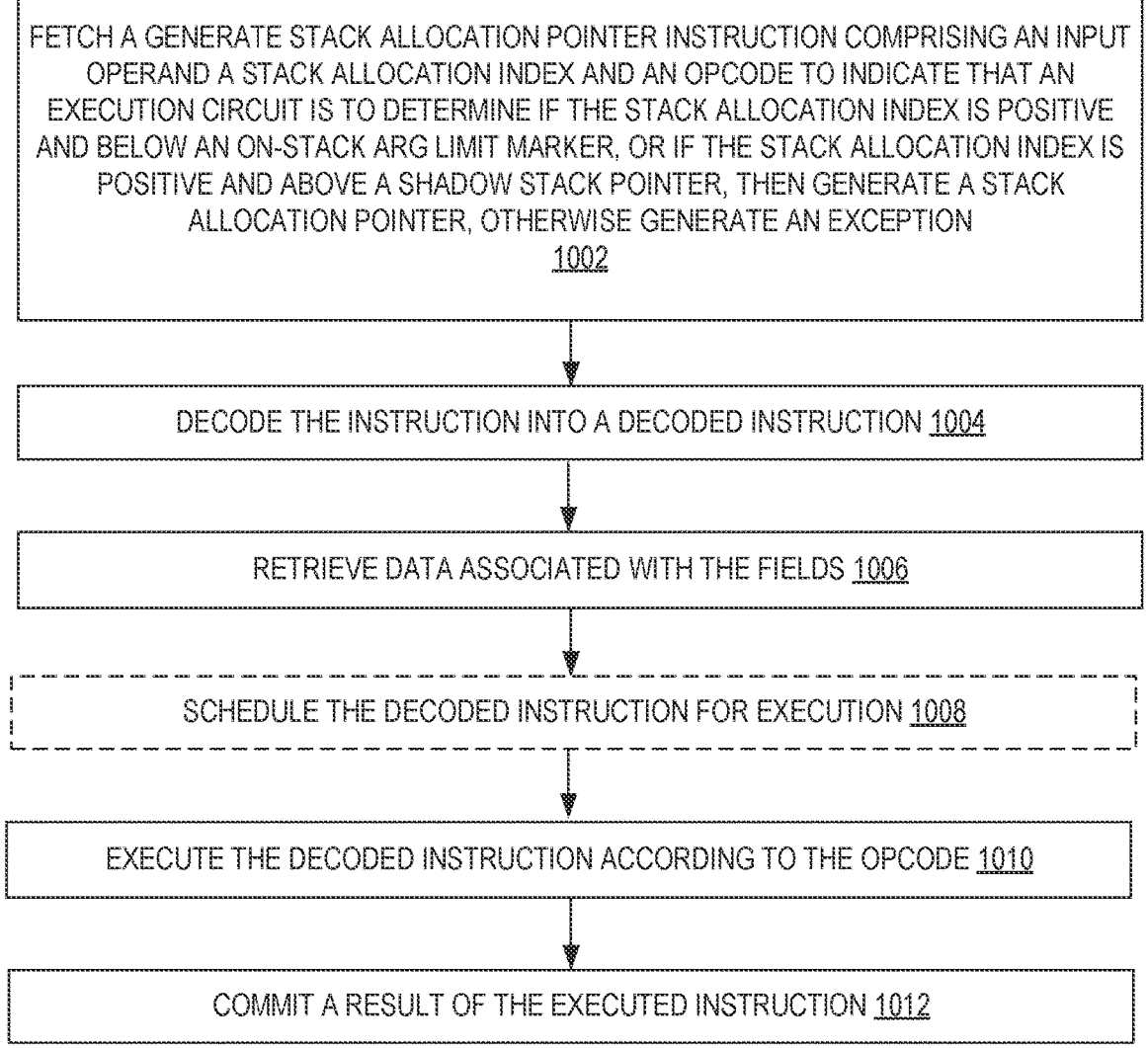
FIG. 10 illustrates operations of a method of processing a generate stack allocation pointer instruction according to examples of the disclosure.

FIG. 10 illustrates operations 1000 of a method of processing a generate stack allocation pointer instruction according to examples of the disclosure. In certain examples, a processor (e.g., or processor core) performs the method, e.g., in response to receiving a request to execute an instruction from software. Depicted operations 1000 of the method include processing a single generate stack allocation pointer instruction by: fetching the generate stack allocation pointer instruction comprising a field to indicate a stack allocation index 662 as an operand, and an opcode to indicate that an execution circuit is to generate a stack allocation pointer 660 at 1002, decoding the instruction into a decoded instruction at 1004, retrieving data associated with the fields at 1006, (optionally) scheduling the decoded instruction for execution at 1008, executing the decoded instruction according to the opcode at 1010, and committing a result of the executed instruction at 1012.

To place an on-stack argument limit marker 628 at an appropriate location in the shadow stack 154, in one implementation a Place On-Stack Arg Limit (PlaceOnStackArgLimit) instruction may be defined to push the on-stack arg limit marker 628 onto the shadow stack 154. If a shadow stack frame does not contain any on-stack argument limit marker, then that may indicate that the function did not pass any on-stack arguments to its callee, and hence, the callee should not receive access to the caller stack frame.

Some implementations may store capabilities, e.g., CHERI capabilities, as shadow stack entries. Any checks defined for those capabilities, e.g., on bounds, type, and/or permissions, may be performed during accesses that reference the corresponding shadow stack entries. Tag bits may be used to distinguish capability shadow stack entries from non-capability shadow stack entries.

Some implementations may collect common configurations of type and bounds information for adjacent allocations (e.g., due to the same function being invoked multiple times) into a template that is stored elsewhere in memory 134 and referenced from the shadow stack 154. The template may be protected using a new or existing page marking analogously to how valid shadow stack pages are marked in page tables.

Rather than storing per-allocation shadow stack entries, a shadow stack entry may reference a template. The reference may be contained in or adjacent to a return address entry when the entire stack layout for the function is specified by the template. The stack allocation pointer format may be extended to specify an index and a separate sub-index, such that the index refers to the location of the stack frame entry in the shadow stack (i.e., the template reference location) and the sub-index references the allocation information within that template.

Some implementations may add a version field to stack allocation pointers to block stale references to exited stack frames. The version field value could be compared, e.g., to a field embedded with the return address field in the shadow stack for the corresponding stack frame.

The technology described herein may also be used for binding indirect branch capabilities to function types. Capabilities for code pointers restrict control flow to only the destinations specified in valid capabilities. However, there remains a risk that a stale capability may persist that grants branch access to a code location that has been changed from what it was when the capability was generated. For example, this may result in a function being invoked as the wrong type. For example, Function-as-a-Service (FaaS) workloads may change what functions are installed at code locations over time as various requests arrive over the network. Live patching of running programs may also lead to code changing over time.

Figure 11:
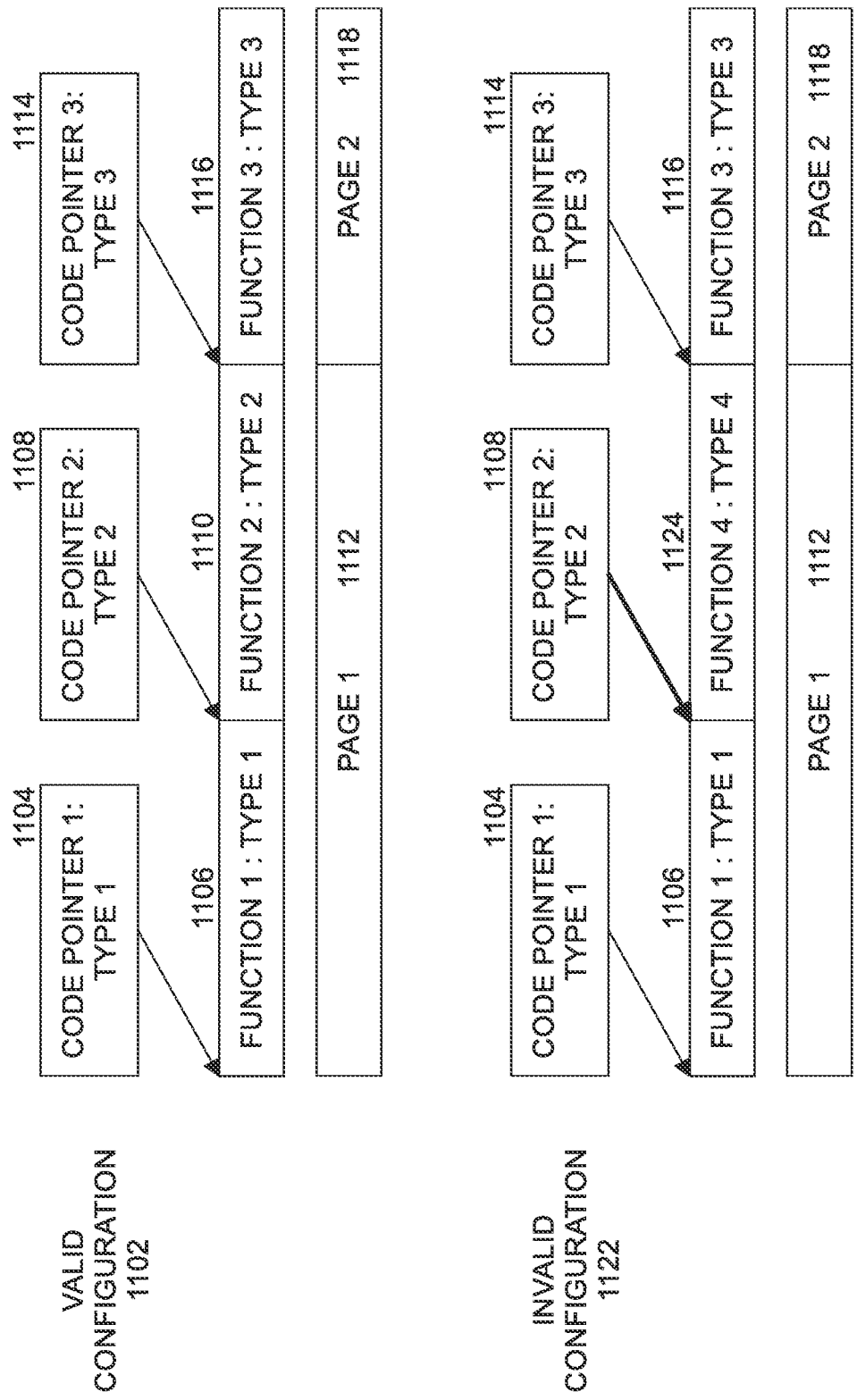
FIG. 11 illustrates a first example of code changes over time.

FIG. 11 illustrates a first example 1100 of code changes over time. In this example, valid configuration 1102 includes code pointer 1 1104 of type 1 pointing to function 1 1106 of type 1, code pointer 2 1108 of type 2 pointing to function 2 1110 of type 2, and code pointer 3 1114 of type 3 pointing to function 3 1116 of type 3. Function 1 1106 and function 2 1110 are stored on page 1 1112 and function 3 1116 is stored on page 2 1118. As code changes over time, a stale capability may persist. In this example, invalid configuration 1122 includes code pointer 2 1108 of type 2 now pointing to function 4 1124 of type 4, which is an error due to the stale code pointer 2.

Additionally, an adversary may corrupt address translation information (e.g., in page tables), such that the address mappings for code are modified and hence the same code address ends up pointing to different code than the code address would during correct execution.

Figure 12:
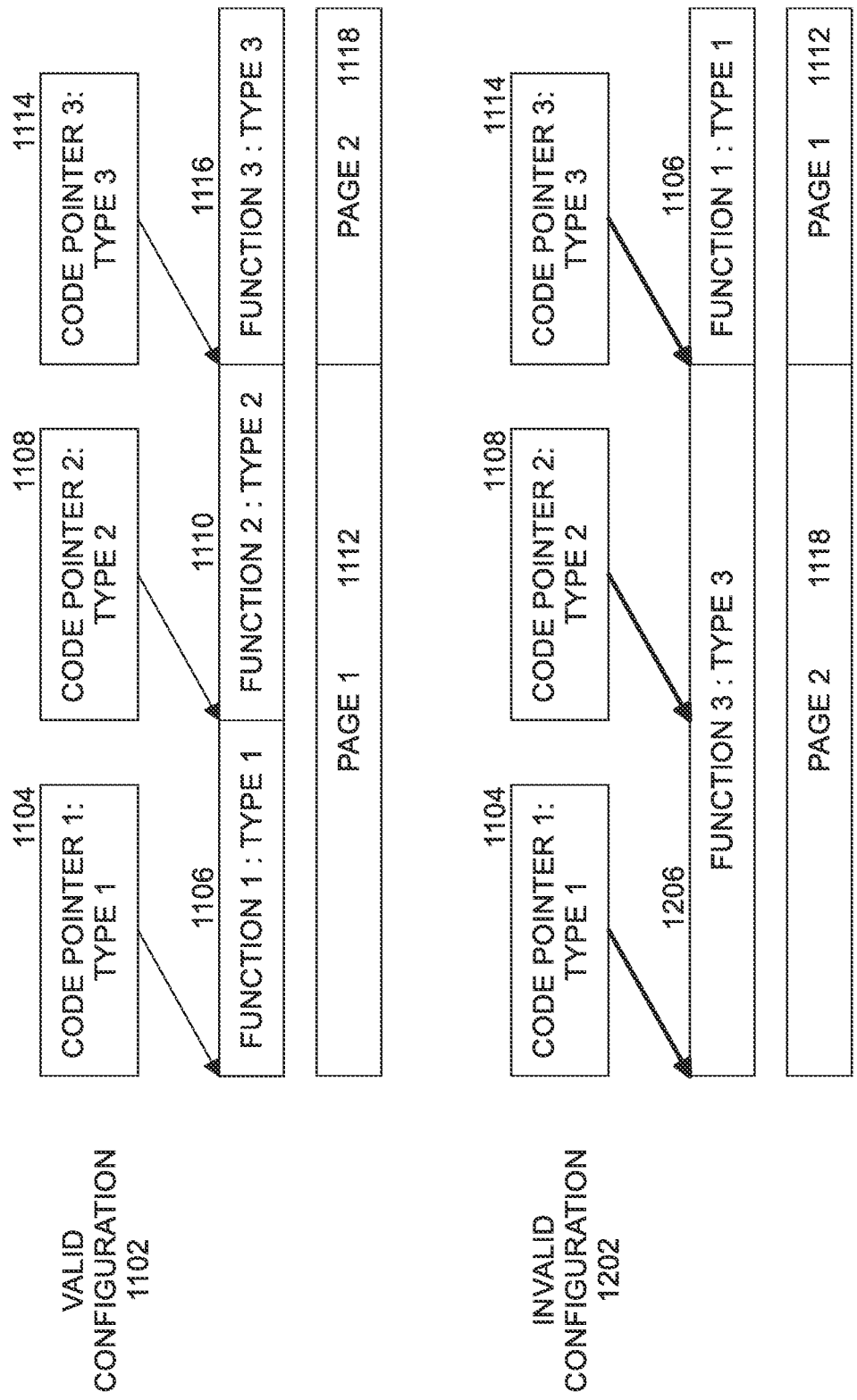
FIG. 12 illustrates a second example of code changes over time.

FIG. 12 illustrates a second example 1200 of code changes over time. In this example, invalid configuration 1202 includes code pointer 1 1104 and code pointer 2 1108 pointing to function 3 1206 of type 3 and code pointer 3 1114 pointing to function 1 1106 of type 1. Code pointer 1 1104 now points to the beginning of function 3 1206 where the type of the code pointer does not match the type of the function, which is an error. Code pointer 2 1108 now points to a location inside function 3 1206, i.e., an invalid entry point.

In one implementation, these risks may be addressed by extending an end branch (ENDBRANCH) instruction with a function type field that is matched against a corresponding field in code capabilities. If there is a mismatch, the processor 100 generates an exception.

Figure 13:
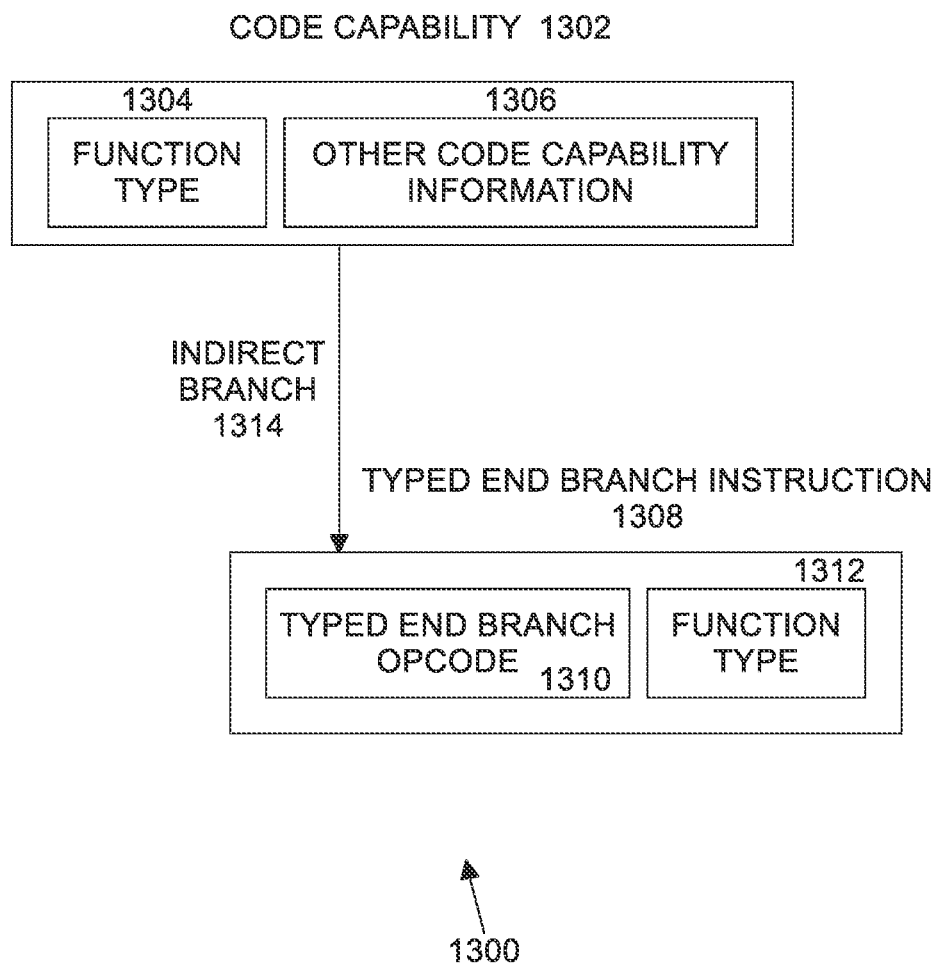
FIG. 13 illustrates a function type of a typed end branch instruction according to examples of the disclosure.

FIG. 13 illustrates an example 1300 of a function type 1304 of a typed end branch instruction 1308 according to examples of the disclosure. Function type 1304 is included in code capability 1302 along with other code capability information 1306. A function type 1312 is included in the typed end branch instruction 1308, along with a typed end branch opcode 1310. When an indirect branch 1314 is encountered using code capability 1302, the processor compares the function type 1304 in the code capability 1302 to the function type 1312 in the typed end branch instruction. If the function types do not match, an exception is generated.

Figure 14:
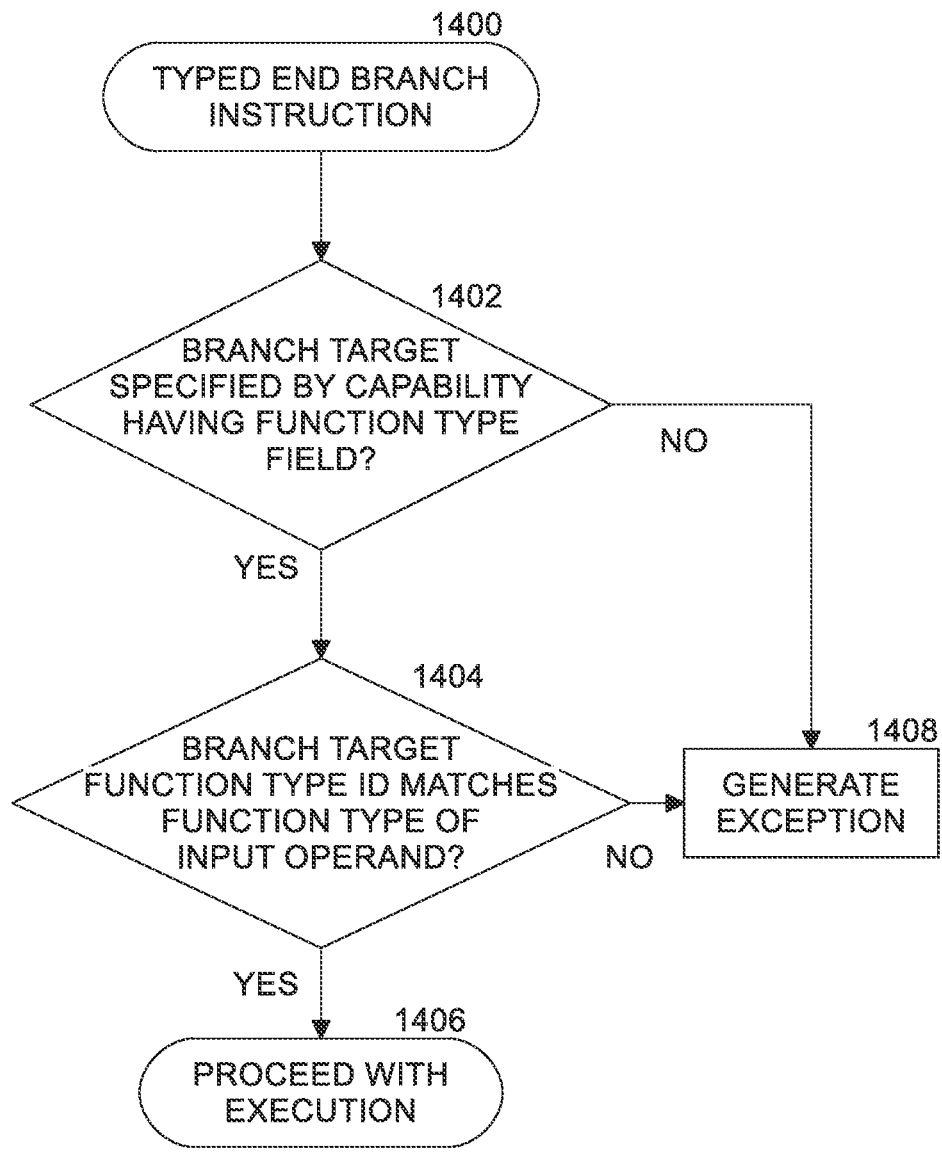
FIG. 14 illustrates operations of a method for processing a typed end branch instruction according to examples of the disclosure.

FIG. 14 illustrates operations 1400 of a method of processing a typed end branch according to examples of the disclosure, e.g., as caused by the execution of a single typed end branch pointer instruction. Some or all of the operations 1400 (or other processes described herein, or variations, and/or combinations thereof) are performed under the control of a processor (e.g., including a capability management circuit) as implemented herein and/or one or more computer systems configured with executable instruction(s) and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1400 are performed by a processor of the other figures.

Processing of typed end branch instruction 1400 starts with the processor determining at block 1402 if the branch target specified by the (code) capability has a function type field storing a function type. If so, at block 1404 the processor determines if the branch target function type matches the function type of the input operand to the typed end branch instruction. If so, processing of the branch continues at block 1406. If the branch target does not have a function type field or the branch target function type does not match the function type of the input operand, then an exception is generated at block 1408.

Figure 15:
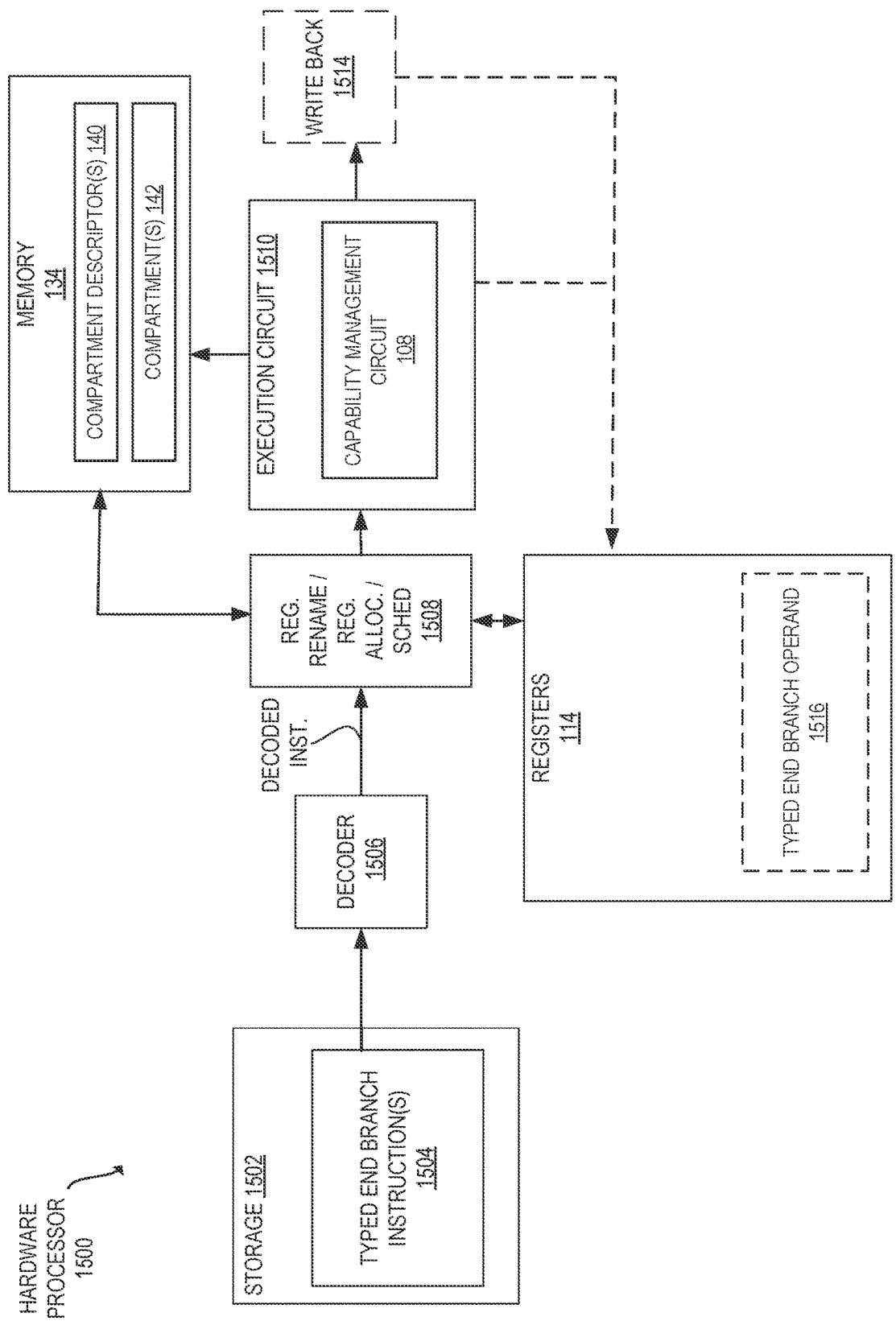
FIG. 15 illustrates a hardware processor coupled to storage that includes one or more typed end branch instructions according to examples of the disclosure.

FIG. 15 illustrates a hardware processor 1500 coupled to storage 1502 that includes one or more typed end branch instructions 1504 according to examples of the disclosure. In certain examples, a typed end branch instruction is according to any of the disclosure herein.

In certain examples, e.g., in response to a request to perform a typed end branch operation, the instruction (e.g., macro-instruction) 1504 is fetched from storage 1502 and sent to decoder 1506. In the depicted example, the decoder 1506 (e.g., decoder circuit) decodes the instruction into a decoded instruction (e.g., one or more micro-instructions or micro-operations). The decoded instruction is then sent for execution, e.g., via scheduler circuit 1508 to schedule the decoded instruction for execution.

In certain examples, (e.g., where the processor/core supports out-of-order (OoO) execution), the processor includes a register rename/allocator circuit 1508 coupled to register file 114 (e.g., and memory 134) to allocate resources and perform register renaming on registers (e.g., registers associated with the initial sources and final destination of the instruction). In certain examples, (e.g., for out-of-order execution), the processor includes one or more scheduler circuits 1508 coupled to the decoder 1506. The scheduler circuit(s) may schedule one or more operations associated with decoded instructions, including one or more operations decoded from an initialize compartment instruction 1504, e.g., for execution on the execution circuit 1510. In the depicted example, capability management circuit 108 is within the execution circuit 1510.

As one example, a decoded typed end branch instruction 1504 is to determine if a branch target is specified by a capability having a function type field and the branch target function type matches the function type of the input operand, otherwise generate an exception.

In certain examples, a write back circuit 1514 is included to write back results of an instruction to a destination (e.g., write them to memory 134), for example, so those results are visible within the memory 134 (e.g., visible outside of the execution circuit that produced those results).

One or more of these components (e.g., decoder 1506, register rename/register allocator/scheduler 1508, execution circuit 1510, registers (e.g., register file) 1512, memory 134, or write back circuit 1514) may be in a single core of a hardware processor (e.g., and multiple cores each with an instance of these components).

Figure 16:
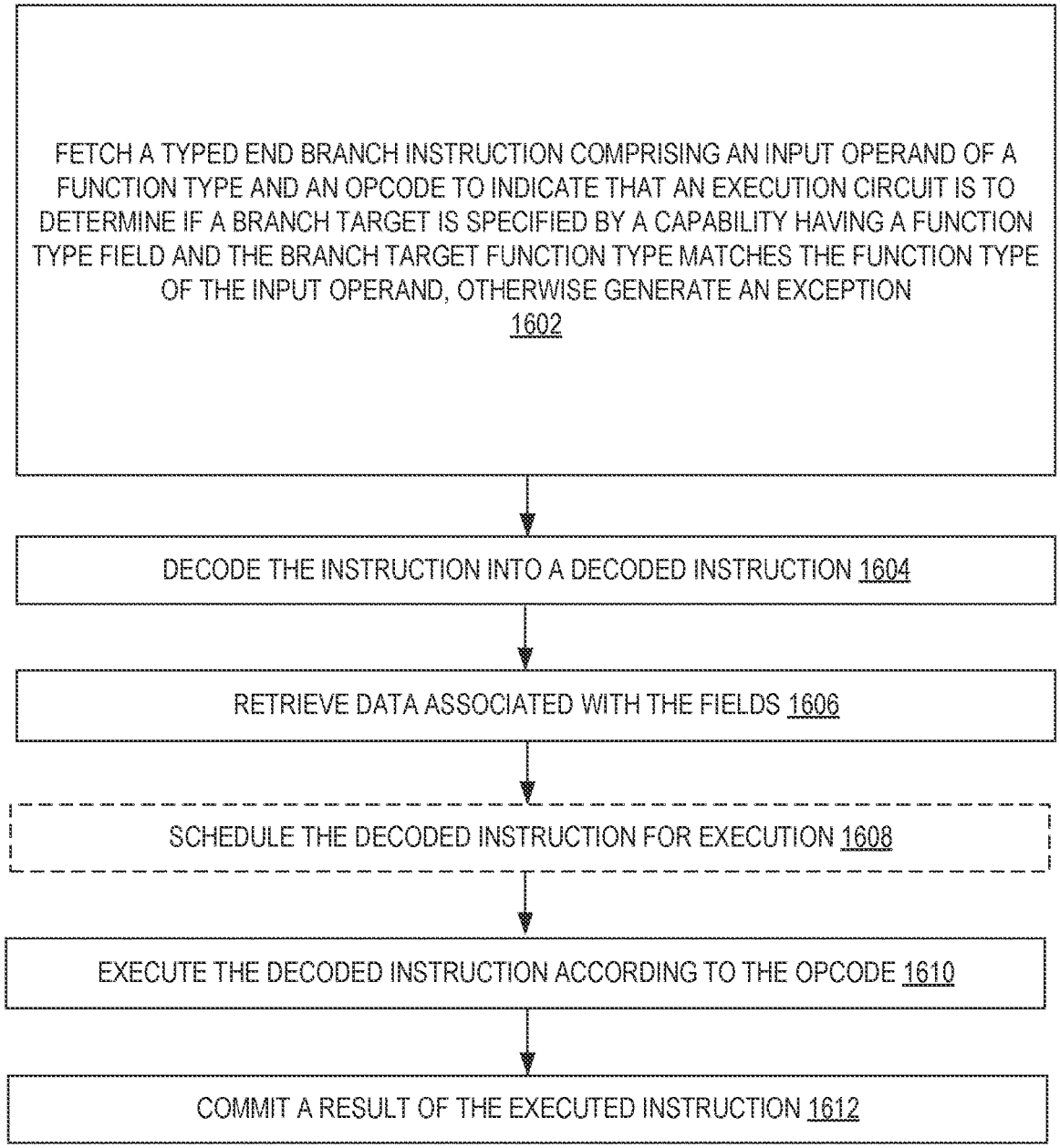
FIG. 16 illustrates operations of a method of processing a typed end branch instruction according to examples of the disclosure.

FIG. 16 illustrates operations 1600 of a method of processing a typed end branch instruction according to examples of the disclosure. In certain examples, a processor (e.g., or processor core) performs the method, e.g., in response to receiving a request to execute an instruction from software. Depicted operations 1600 of the method include processing a single typed end branch instruction by: fetching a typed end branch instruction comprising one or more fields to indicate an input operand of a function type and an opcode to indicate that an execution circuit is to determine if a branch target is specified by a capability having a function type field and the branch target function type matches the function type of the input operand, otherwise generate an exception at 1602, decoding the instruction into a decoded instruction at 1604, retrieving data associated with the fields at 1606, (optionally) scheduling the decoded instruction for execution at 1608, executing the decoded instruction according to the opcode at 1610, and committing a result of the executed instruction at 1612.

The typed end branch instruction 1308 may also be used to protect reverse control flows, e.g., by encoding return addresses on the main stack as capabilities that contain a field specifying the function type. The function type can be specified in or adjacent to the corresponding return address entry in the shadow stack 154, and an exception can be generated if there is a mismatch. Returns can be required to land on ENDBRANCH instructions as well that specify the callee function type. This combines usefully with the implementation described above of specifying a template for local allocations that can secondarily serve to distinguish different types of functions. That template ID or address may be used as a de facto function type.

Exemplary architectures, systems, etc. that the above may be used in are detailed below. Exemplary instruction formats for capability instructions are detailed below.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format.

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

Figure 17A:
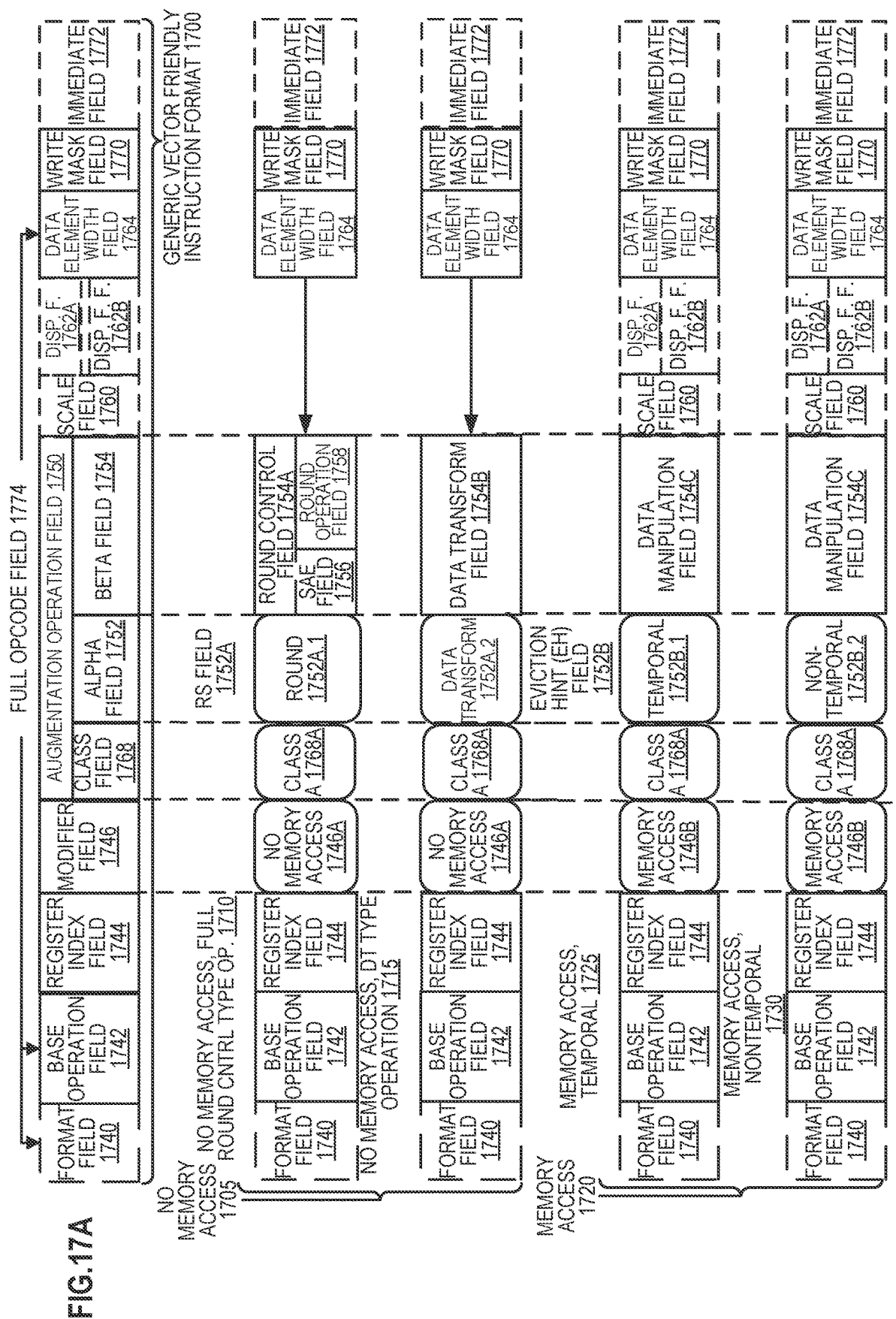
FIG. 17A is a block diagram illustrating a generic vector friendly instruction format and class A instruction templates thereof according to examples of the disclosure.
Figure 17B:
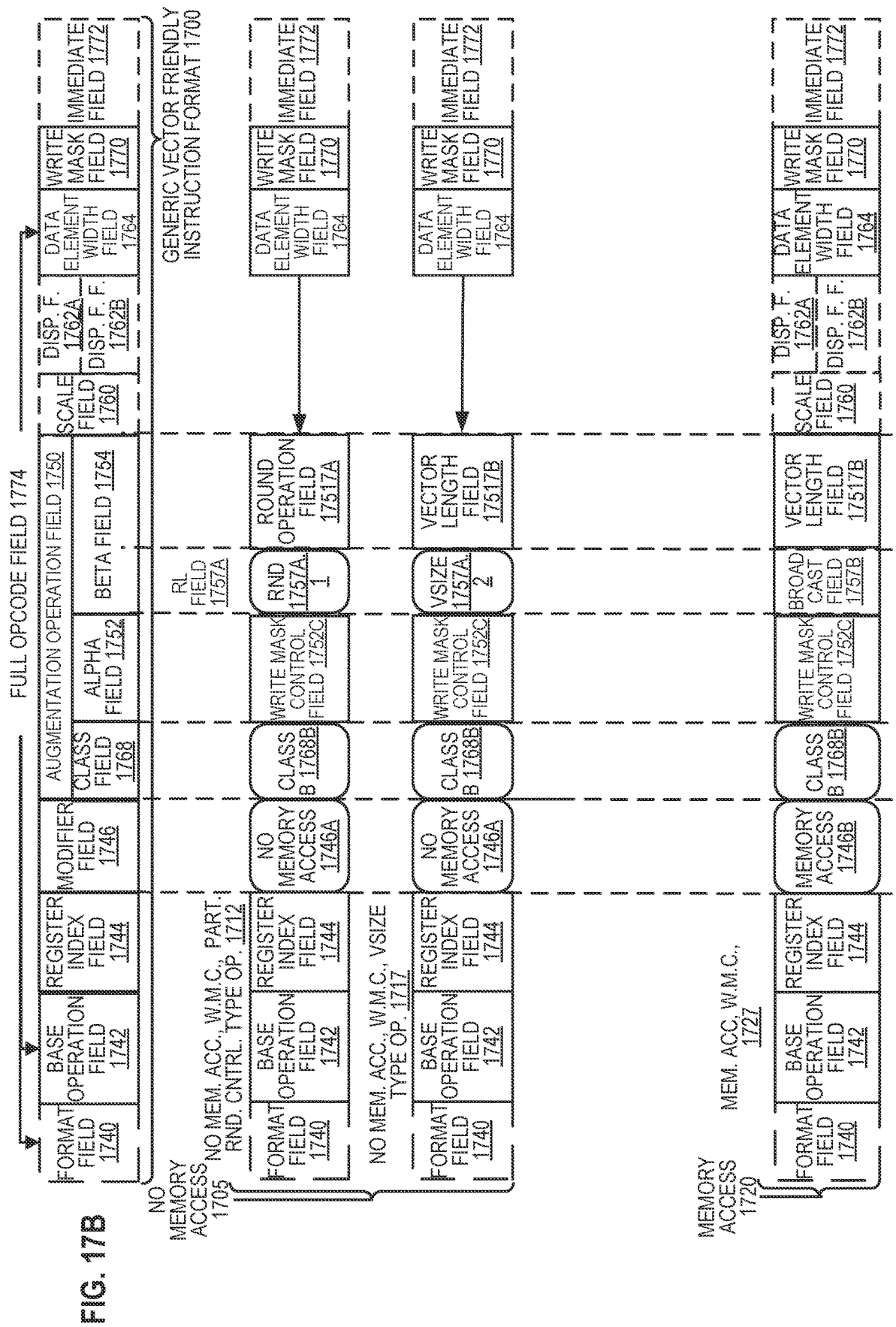
FIG. 17B is a block diagram illustrating the generic vector friendly instruction format and class B instruction templates thereof according to examples of the disclosure.

FIGS. 17A-17B are block diagrams illustrating a generic vector friendly instruction format and instruction templates thereof according to examples of the disclosure. FIG. 17A is a block diagram illustrating a generic vector friendly instruction format and class A instruction templates thereof according to examples of the disclosure; while FIG. 17B is a block diagram illustrating the generic vector friendly instruction format and class B instruction templates thereof according to examples of the disclosure. Specifically, a generic vector friendly instruction format 1700 for which are defined class A and class B instruction templates, both of which include no memory access 1705 instruction templates and memory access 1720 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 17A include: 1) within the no memory access 1705 instruction templates there is shown a no memory access, full round control type operation 1710 instruction template and a no memory access, data transform type operation 1715 instruction template; and 2) within the memory access 1720 instruction templates there is shown a memory access, temporal 1725 instruction template and a memory access, non-temporal 1730 instruction template. The class B instruction templates in FIG. 17B include: 1) within the no memory access 1705 instruction templates there is shown a no memory access, write mask control, partial round control type operation 1712 instruction template and a no memory access, write mask control, vsize type operation 1717 instruction template; and 2) within the memory access 1720 instruction templates there is shown a memory access, write mask control 1727 instruction template.

The generic vector friendly instruction format 1700 includes the following fields listed below in the order illustrated in FIGS. 17A-17B.

Format field 1740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1742—its content distinguishes different base operations.

Register index field 1744—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 1746—its content distinguishes occurrences of instructions in the generic vector instruction format that specify memory access from those that do not; that is, between no memory access 1705 instruction templates and memory access 1720 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 1750—its content distinguishes which one of a variety of different operations to be performed in addition to the base operation. This field is context specific. In one example of the disclosure, this field is divided into a class field 1768, an alpha field 1752, and a beta field 1754. The augmentation operation field 1750 allows common groups of operations to be performed in a single instruction rather than 2, 3, or 4 instructions.

Scale field 1760—its content allows for the scaling of the index field's content for memory address generation (e.g., for address generation that uses $2^{scale}*\text{index}+\text{base}$).

Displacement Field 1762A—its content is used as part of memory address generation (e.g., for address generation that uses $2^{scale}*\text{index}+\text{base}+\text{displacement}$).

Displacement Factor Field 1762B (note that the juxtaposition of displacement field 1762A directly over displacement factor field 1762B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1774 (described later herein) and the data manipulation field 1754C. The displacement field 1762A and the displacement factor field 1762B are optional in the sense that they are not used for the no memory access 1705 instruction templates and/or different examples may implement only one or none of the two.

Data element width field 1764—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 1770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1770 allows for partial vector operations, including loads, stores, arithmetic, logical, etc. While examples of the disclosure are described in which the write mask field's 1770 content selects one of a number of write mask registers that contains the write mask to be used (and thus the write mask field's 1770 content indirectly identifies that masking to be performed), alternative examples instead or additional allow the mask write field's 1770 content to directly specify the masking to be performed.

Immediate field 1772—its content allows for the specification of an immediate. This field is optional in the sense that it is not present in an implementation of the generic vector friendly format that does not support immediate and it is not present in instructions that do not use an immediate.

Class field 1768—its content distinguishes between different classes of instructions. With reference to FIGS. 17A-B, the contents of this field select between class A and class B instructions. In FIGS. 17A-B, rounded corner squares are used to indicate a specific value is present in a field (e.g., class A 1768A and class B 1768B for the class field 1768 respectively in FIGS. 17A-B).

Instruction Templates of Class A.

In the case of the non-memory access 1705 instruction templates of class A, the alpha field 1752 is interpreted as an RS field 1752A, whose content distinguishes which one of the different augmentation operation types are to be performed (e.g., round 1752A.1 and data transform 1752A.2 are respectively specified for the no memory access, round type operation 1710 and the no memory access, data transform type operation 1715 instruction templates), while the beta field 1754 distinguishes which of the operations of the specified type is to be performed. In the no memory access 1705 instruction templates, the scale field 1760, the displacement field 1762A, and the displacement scale filed 1762B are not present.

No-Memory Access Instruction Templates—Full Round Control Type Operation.

In the no memory access full round control type operation 1710 instruction template, the beta field 1754 is interpreted as a round control field 1754A, whose content(s) provide static rounding. While in the described examples of the disclosure the round control field 1754A includes a suppress all floating point exceptions (SAE) field 1756 and a round operation control field 1758, alternative examples may support may encode both these concepts into the same field or only have one or the other of these concepts/fields (e.g., may have only the round operation control field 1758).

SAE field 1756—its content distinguishes whether or not to disable the exception event reporting; when the SAE field's 1756 content indicates suppression is enabled, a given instruction does not report any kind of floating-point exception flag and does not raise any floating point exception handler.

Round operation control field 1758—its content distinguishes which one of a group of rounding operations to perform (e.g., Round-up, Round-down, Round-towards-zero and Round-to-nearest). Thus, the round operation control field 1758 allows for the changing of the rounding mode on a per instruction basis. In one example of the disclosure where a processor includes a control register for specifying rounding modes, the round operation control field's 1750 content overrides that register value.

No Memory Access Instruction Templates—Data Transform Type Operation.

In the no memory access data transform type operation 1715 instruction template, the beta field 1754 is interpreted as a data transform field 1754B, whose content distinguishes which one of a number of data transforms is to be performed (e.g., no data transform, swizzle, broadcast).

In the case of a memory access 1720 instruction template of class A, the alpha field 1752 is interpreted as an eviction hint field 1752B, whose content distinguishes which one of the eviction hints is to be used (in FIG. 17A, temporal 1752B.1 and non-temporal 1752B.2 are respectively specified for the memory access, temporal 1725 instruction template and the memory access, non-temporal 1730 instruction template), while the beta field 1754 is interpreted as a data manipulation field 1754C, whose content distinguishes which one of a number of data manipulation operations (also known as primitives) is to be performed (e.g., no manipulation; broadcast; up conversion of a source; and down conversion of a destination). The memory access 1720 instruction templates include the scale field 1760, and optionally the displacement field 1762A or the displacement scale field 1762B.

Vector memory instructions perform vector loads from and vector stores to memory, with conversion support. As with regular vector instructions, vector memory instructions transfer data from/to memory in a data element-wise fashion, with the elements that are transferred is dictated by the contents of the vector mask that is selected as the write mask.

Memory Access Instruction Templates—Temporal.

Temporal data is data likely to be reused soon enough to benefit from caching. This is, however, a hint, and different processors may implement it in different ways, including ignoring the hint entirely.

Memory Access Instruction Templates—Non-Temporal.

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B.

In the case of the instruction templates of class B, the alpha field 1752 is interpreted as a write mask control (Z) field 1752C, whose content distinguishes whether the write masking controlled by the write mask field 1770 should be a merging or a zeroing.

In the case of the non-memory access 1705 instruction templates of class B, part of the beta field 1754 is interpreted as an RL field 1757A, whose content distinguishes which one of the different augmentation operation types are to be performed (e.g., round 1757A.1 and vector length (VSIZE) 1757A.2 are respectively specified for the no memory access, write mask control, partial round control type operation 1712 instruction template and the no memory access, write mask control, VSIZE type operation 1717 instruction template), while the rest of the beta field 1754 distinguishes which of the operations of the specified type is to be performed. In the no memory access 1705 instruction templates, the scale field 1760, the displacement field 1762A, and the displacement scale filed 1762B are not present.

In the no memory access, write mask control, partial round control type operation 1710 instruction template, the rest of the beta field 1754 is interpreted as a round operation field 1759A and exception event reporting is disabled (a given instruction does not report any kind of floating-point exception flag and does not raise any floating point exception handler).

Round operation control field 1759A—just as round operation control field 1758, its content distinguishes which one of a group of rounding operations to perform (e.g., Round-up, Round-down, Round-towards-zero and Round-to-nearest). Thus, the round operation control field 1759A allows for the changing of the rounding mode on a per instruction basis. In one example of the disclosure where a processor includes a control register for specifying rounding modes, the round operation control field's 1750 content overrides that register value.

In the no memory access, write mask control, VSIZE type operation 1717 instruction template, the rest of the beta field 1754 is interpreted as a vector length field 1759B, whose content distinguishes which one of a number of data vector lengths is to be performed on (e.g., 128, 256, or 512 byte).

In the case of a memory access 1720 instruction template of class B, part of the beta field 1754 is interpreted as a broadcast field 1757B, whose content distinguishes whether or not the broadcast type data manipulation operation is to be performed, while the rest of the beta field 1754 is interpreted the vector length field 1759B. The memory access 1720 instruction templates include the scale field 1760, and optionally the displacement field 1762A or the displacement scale field 1762B.

With regard to the generic vector friendly instruction format 1700, a full opcode field 1774 is shown including the format field 1740, the base operation field 1742, and the data element width field 1764. While one example is shown where the full opcode field 1774 includes all of these fields, the full opcode field 1774 includes less than all of these fields in examples that do not support all of them. The full opcode field 1774 provides the operation code (opcode).

The augmentation operation field 1750, the data element width field 1764, and the write mask field 1770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format.

FIG. 18A is a block diagram illustrating an exemplary specific vector friendly instruction format according to examples of the disclosure. FIG. 18A shows a specific vector friendly instruction format 1800 that is specific in the sense that it specifies the location, size, interpretation, and order of the fields, as well as values for some of those fields. The specific vector friendly instruction format 1800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 17 into which the fields from FIG. 18A map are illustrated.

It should be understood that, although examples of the disclosure are described with reference to the specific vector friendly instruction format 1800 in the context of the generic vector friendly instruction format 1700 for illustrative purposes, the disclosure is not limited to the specific vector friendly instruction format 1800 except where claimed. For example, the generic vector friendly instruction format 1700 contemplates a variety of possible sizes for the various fields, while the specific vector friendly instruction format 1800 is shown as having fields of specific sizes. By way of specific example, while the data element width field 1764 is illustrated as a one bit field in the specific vector friendly instruction format 1800, the disclosure is not so limited (that is, the generic vector friendly instruction format 1700 contemplates other sizes of the data element width field 1764).

The generic vector friendly instruction format 1700 includes the following fields listed below in the order illustrated in FIG. 18A.

EVEX Prefix (Bytes 0-3) 1802—is encoded in a four-byte form.

Format Field 1740 (EVEX Byte 0, bits [7:0])—the first byte (EVEX Byte 0) is the format field 1740 and it contains 0x62 (the unique value used for distinguishing the vector friendly instruction format in one example of the disclosure).

The second-fourth bytes (EVEX Bytes 1-3) include a number of bit fields providing specific capability.

REX field 1805 (EVEX Byte 1, bits [7-5])—consists of an EVEX.R bit field (EVEX Byte 1, bit [7]-R), EVEX.X bit field (EVEX byte 1, bit [6]-X), and 1757BEX byte 1, bit[5]-B). The EVEX.R, EVEX.X, and EVEX.B bit fields provide the same functionality as the corresponding VEX bit fields, and are encoded using 1s complement form, e.g., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1710—this is the first part of the REX' field 1710 and is the EVEX.R' bit field (EVEX Byte 1, bit [4]-R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1815 (EVEX byte 1, bits [3:0]-mmmm)—its content encodes an implied leading opcode byte (0F, 0F 38, or 0F 3).

Data element width field 1764 (EVEX byte 2, bit [7]-W)—is represented by the notation EVEX.W. EVEX.W is used to define the granularity (size) of the datatype (either 32-bit data elements or 64-bit data elements).

EVEX.vvvv 1820 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1820 encodes the 4 low-order bits of the first source register specifier stored in inverted (1s complement) form. Depending on the instruction, an extra different EVEX bit field is used to extend the specifier size to 32 registers.

EVEX.U 1768 Class field (EVEX byte 2, bit [2]-U)—If EVEX.0=0, it indicates class A or EVEX.U0; if EVEX.0=1, it indicates class B or EVEX.U1.

Prefix encoding field 1825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2-bit SIMD prefix encodings, and thus not require the expansion.

Alpha field 1752 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 1754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1770 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1830 (Byte 4) is also known as the opcode byte. Part of the opcode is specified in this field.

MOD R/M Field 1840 (Byte 5) includes MOD field 1842, Reg field 1844, and R/M field 1846. As previously described, the MOD field's 1842 content distinguishes between memory access and non-memory access operations. The role of Reg field 1844 can be summarized to two situations: encoding either the destination register operand or a source register operand, or be treated as an opcode extension and not used to encode any instruction operand. The role of R/M field 1846 may include the following: encoding the instruction operand that references a memory address, or encoding either the destination register operand or a source register operand.

Scale, Index, Base (SIB) Byte (Byte 6)—As previously described, the scale field's 1750 content is used for memory address generation. SIB.xxx 1854 and SIB.bbb 1856—the contents of these fields have been previously referred to with regard to the register indexes Xxxx and Bbbb.

Displacement field 1762A (Bytes 7-10)—when MOD field 1842 contains 10, bytes 7-10 are the displacement field 1762A, and it works the same as the legacy 32-bit displacement (disp32) and works at byte granularity.

Displacement factor field 1762B (Byte 7)—when MOD field 1842 contains 01, byte 7 is the displacement factor field 1762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1762B is a reinterpretation of disp8; when using displacement factor field 1762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1762B substitutes the legacy x86 instruction set 8-bit displacement. Thus, the displacement factor field 1762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1772 operates as previously described.

Full Opcode Field.

FIG. 18B is a block diagram illustrating the fields of the specific vector friendly instruction format 1800 that make up the full opcode field 1774 according to one example of the disclosure. Specifically, the full opcode field 1774 includes the format field 1740, the base operation field 1742, and the data element width (W) field 1764. The base operation field 1742 includes the prefix encoding field 1825, the opcode map field 1815, and the real opcode field 1830.

Register Index Field.

FIG. 18C is a block diagram illustrating the fields of the specific vector friendly instruction format 1800 that make up the register index field 1744 according to one example of the disclosure. Specifically, the register index field 1744 includes the REX field 1805, the REX' field 1810, the MODR/M.reg field 1844, the MODR/M.r/m field 1846, the VVVV field 1820, xxx field 1854, and the bbb field 1856.

Augmentation Operation Field.

Figure 18D:
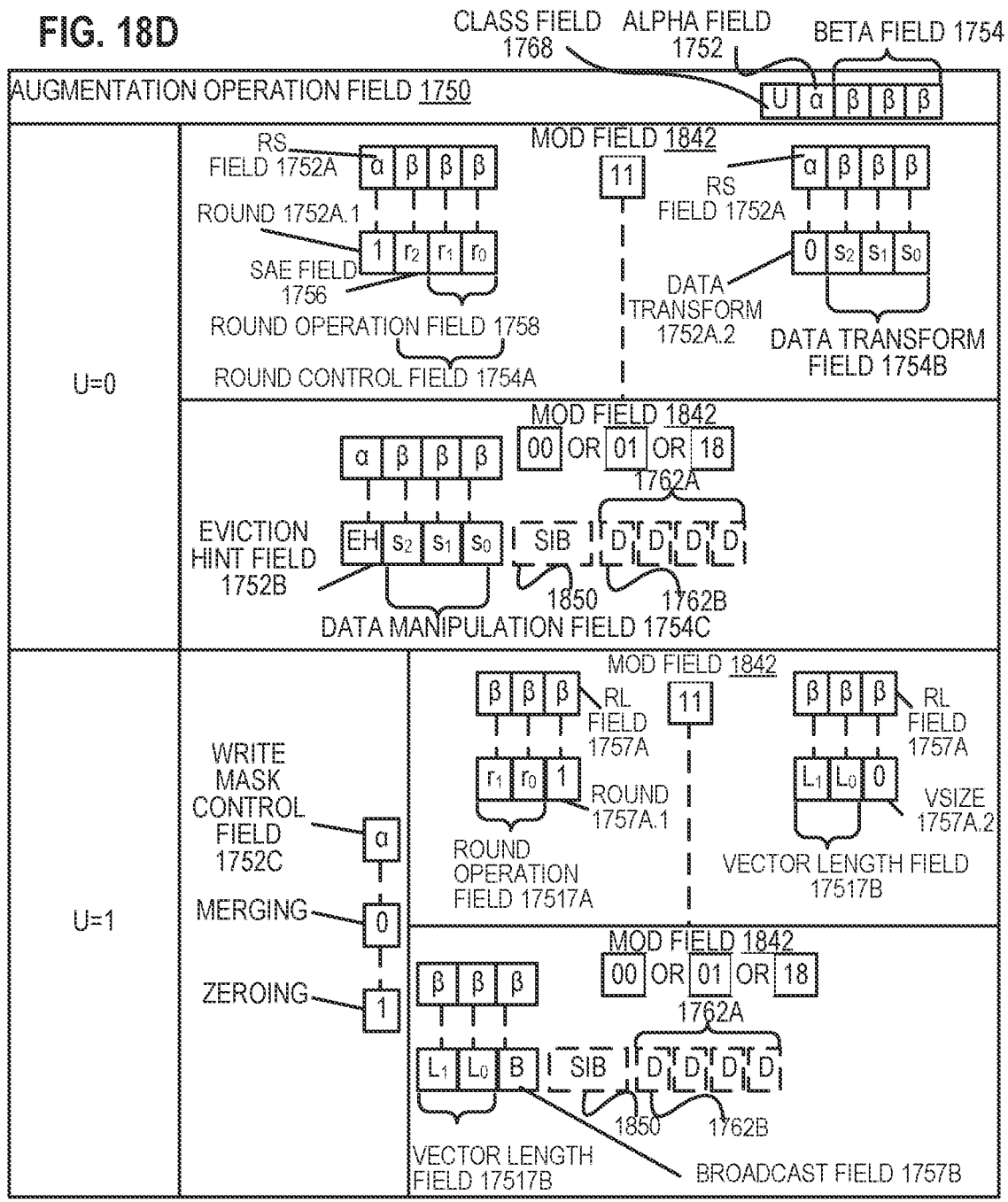
FIG. 18D is a block diagram illustrating the fields of the specific vector friendly instruction format in FIG. 18A that make up the augmentation operation field according to one example of the disclosure.

FIG. 18D is a block diagram illustrating the fields of the specific vector friendly instruction format 1800 that make up the augmentation operation field 1750 according to one example of the disclosure. When the class (U) field 1768 contains 0, it signifies EVEX.U0 (class A 1768A); when it contains 1, it signifies EVEX.U1 (class B 1768B). When U=0 and the MOD field 1842 contains 11 (signifying a no memory access operation), the alpha field 1752 (EVEX byte 3, bit [7]-EH) is interpreted as the rs field 1752A. When the rs field 1752A contains a 1 (round 1752A.1), the beta field 1754 (EVEX byte 3, bits [6:4]-SSS) is interpreted as the round control field 1754A. The round control field 1754A includes a one-bit SAE field 1756 and a two-bit round operation field 1758. When the rs field 1752A contains a 0 (data transform 1752A.2), the beta field 1754 (EVEX byte 3, bits [6:4]-SSS) is interpreted as a three-bit data transform field 1754B. When U=0 and the MOD field 1842 contains 00, 01, or 10 (signifying a memory access operation), the alpha field 1752 (EVEX byte 3, bit [7]-EH) is interpreted as the eviction hint (EH) field 1752B and the beta field 1754 (EVEX byte 3, bits [6:4]-SSS) is interpreted as a three-bit data manipulation field 1754C.

When U=1, the alpha field 1752 (EVEX byte 3, bit [7]-EH) is interpreted as the write mask control (Z) field 1752C. When U=1 and the MOD field 1842 contains 11 (signifying a no memory access operation), part of the beta field 1754 (EVEX byte 3, bit [4]-$S_0$) is interpreted as the RL field 1757A; when it contains a 1 (round 1757A.1) the rest of the beta field 1754 (EVEX byte 3, bit [6-5]-$S_{2-1}$) is interpreted as the round operation field 1759A, while when the RL field 1757A contains a 0 (VSIZE 1757.A2) the rest of the beta field 1754 (EVEX byte 3, bit [6-5]-$S_{2-1}$) is interpreted as the vector length field 1759B (EVEX byte 3, bit [6-5]-$L_{1-0}$). When U=1 and the MOD field 1842 contains 00, 01, or 18 (signifying a memory access operation), the beta field 1754 (EVEX byte 3, bits [6:4]-SSS) is interpreted as the vector length field 1759B (EVEX byte 3, bit [6-5]-$L_{1-0}$) and the broadcast field 1757B (EVEX byte 3, bit [4]-B).

Exemplary Register Architecture.

Figure 19:
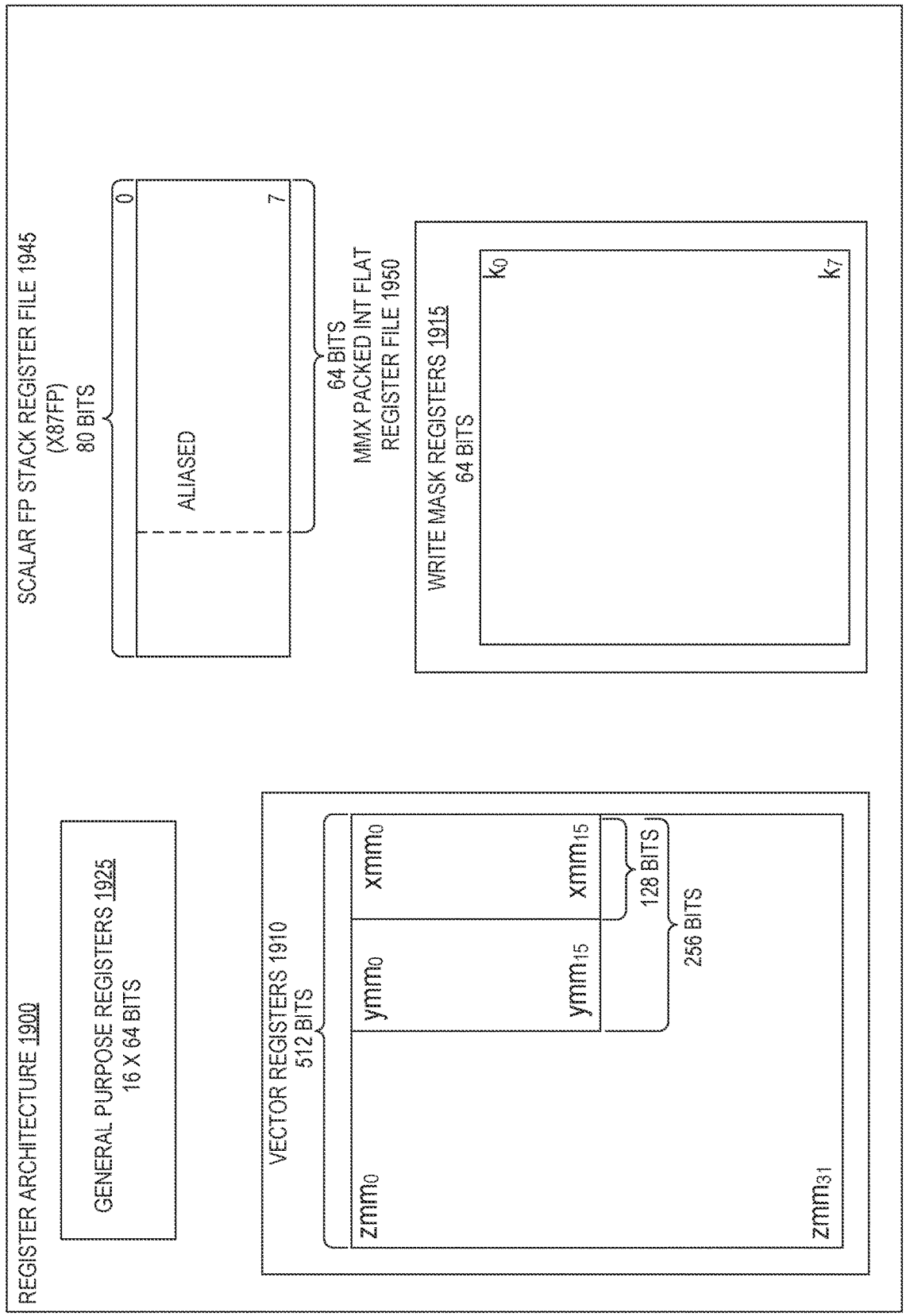
FIG. 19 is a block diagram of a register architecture according to one example of the disclosure

FIG. 19 is a block diagram of a register architecture 1900 according to one example of the disclosure. In the example illustrated, there are 32 vector registers 1910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1700 operates on these overlaid register file as illustrated in the below tables.

| Adjustable Vector Length | Class | Operations | Registers |
|---|---|---|---|
| Instruction Templates that do not include the vector length field 1759B | A (FIG. 17A; U = 0) | 1710, 1715, 1725, 1730 | zmm registers (the vector length is 64 byte) |
| | B (FIG. 17B; U = 1) | 1712 | zmm registers (the vector length is 64 byte) |

-continued

| Adjustable Vector Length | Class | Operations | Registers |
|---|---|---|---|
| Instruction templates that do include the vector length field 1759B | B (FIG. 17B; U = 1) | 1717, 1727 | zmm, ymm, or xmm registers (the vector length is 64 byte, 32 byte, or 16 byte) depending on the vector length field 1759B |

In other words, the vector length field 1759B selects between a maximum length and one or more other shorter lengths, where each such shorter length is half the length of the preceding length; and instructions templates without the vector length field 1759B operate on the maximum vector length. Further, in one example, the class B instruction templates of the specific vector friendly instruction format 1700 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 1915, in the example illustrated, there are 8 write mask registers (k0 through k7), each 64 bits in size. In an alternate example, the write mask registers 1915 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1925, in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1945, on which is aliased the MMX packed integer flat register file 1950, in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers. Additionally, alternative examples of the disclosure may use more, less, or different register files and registers.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures—In-Order and Out-of-Order Core Block Diagram.

FIG. 20A is a block diagram illustrating both an exemplary in-order pipeline and an exemplary register renaming, out-of-order issue/execution pipeline according to examples of the disclosure. FIG. 20B is a block diagram illustrating both an exemplary example of an in-order architecture core and an exemplary register renaming, out-of-order issue/execution architecture core to be included in a processor according to examples of the disclosure. The solid lined boxes in FIGS. 20A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 20A, a processor pipeline 2000 includes a fetch stage 2002, a length decode stage 2004, a decode stage 2006, an allocation stage 2008, a renaming stage 2010, a scheduling (also known as a dispatch or issue) stage 2012, a register read/memory read stage 2014, an execute stage 2016, a write back/memory write stage 2018, an exception handling stage 2022, and a commit stage 2024.

FIG. 20B shows processor core 2090 including a front end unit 2030 coupled to an execution engine unit 2050, and both are coupled to a memory unit 2070. The core 2090 may be a reduced instruction set computing (RISC) core, a complex instruction set computing (CISC) core, a very long instruction word (VLIW) core, or a hybrid or alternative core type. As yet another option, the core 2090 may be a special-purpose core, such as, for example, a network or communication core, compression engine, coprocessor core, general purpose computing graphics processing unit (GPGPU) core, graphics core, or the like.

The front end unit 2030 includes a branch prediction unit 2032 coupled to an instruction cache unit 2034, which is coupled to an instruction translation lookaside buffer (TLB) 2036, which is coupled to an instruction fetch unit 2038, which is coupled to a decode unit 2040. The decode unit 2040 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 2040 may be implemented using various different mechanisms. Examples of suitable mechanisms include, but are not limited to, look-up tables, hardware implementations, programmable logic arrays (PLAs), microcode read only memories (ROMs), etc. In one example, the core 2090 includes a microcode ROM or other medium that stores microcode for certain macro-instructions (e.g., in decode unit 2040 or otherwise within the front end unit 2030). The decode unit 2040 is coupled to a rename/allocator unit 2052 in the execution engine unit 2050.

The execution engine unit 2050 includes the rename/allocator unit 2052 coupled to a retirement unit 2054 and a set of one or more scheduler unit(s) 2056. The scheduler unit(s) 2056 represents any number of different schedulers, including reservations stations, central instruction window, etc. The scheduler unit(s) 2056 is coupled to the physical register file(s) unit(s) 2058. Each of the physical register file(s) units 2058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 2058 comprises a vector registers unit, a write mask registers unit, and a scalar registers unit. These register units may provide architectural vector registers, vector mask registers, and general-purpose registers. The physical register file(s) unit(s) 2058 is overlapped by the retirement unit 2054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2054 and the physical register file(s) unit(s) 2058 are coupled to the execution cluster(s) 2060. The execution cluster(s) 2060 includes a set of one or more execution units 2062 and a set of one or more memory access units 2064. The execution units 2062 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 2056, physical register file(s) unit(s) 2058, and execution cluster(s) 2060 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain examples are implemented in which only the execution cluster of this pipeline has the memory access unit(s) 2064). It should also be understood that where separate pipelines are used, one or more of these pipelines may be out-of-order issue/execution and the rest in-order.

The set of memory access units 2064 is coupled to the memory unit 2070, which includes a data TLB unit 2072 coupled to a data cache unit 2074 coupled to a level 2 (L2) cache unit 2076. In one exemplary example, the memory access units 2064 may include a load unit, a store address unit, and a store data unit, each of which is coupled to the data TLB unit 2072 in the memory unit 2070. The instruction cache unit 2034 is further coupled to a level 2 (L2) cache unit 2076 in the memory unit 2070. The L2 cache unit 2076 is coupled to one or more other levels of cache and eventually to a main memory.

In certain examples, a prefetch circuit 2078 is included to prefetch data, for example, to predict access addresses and bring the data for those addresses into a cache or caches (e.g., from memory 2080).

By way of example, the exemplary register renaming, out-of-order issue/execution core architecture may implement the pipeline 2000 as follows: 1) the instruction fetch 2038 performs the fetch and length decoding stages 2002 and 2004; 2) the decode unit 2040 performs the decode stage 2006; 3) the rename/allocator unit 2052 performs the allocation stage 2008 and renaming stage 2010; 4) the scheduler unit(s) 2056 performs the schedule stage 2012; 5) the physical register file(s) unit(s) 2058 and the memory unit 2070 perform the register read/memory read stage 2014; the execution cluster 2060 perform the execute stage 2016; 6) the memory unit 2070 and the physical register file(s) unit(s) 2058 perform the write back/memory write stage 2018; 7) various units may be involved in the exception handling stage 2022; and 8) the retirement unit 2054 and the physical register file(s) unit(s) 2058 perform the commit stage 2024.

The core 2090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one example, the core 2090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated example of the processor also includes separate instruction and data cache units 2034/2074 and a shared L2 cache unit 2076, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.

Specific Exemplary In-Order Core Architecture.

Figure 21B:
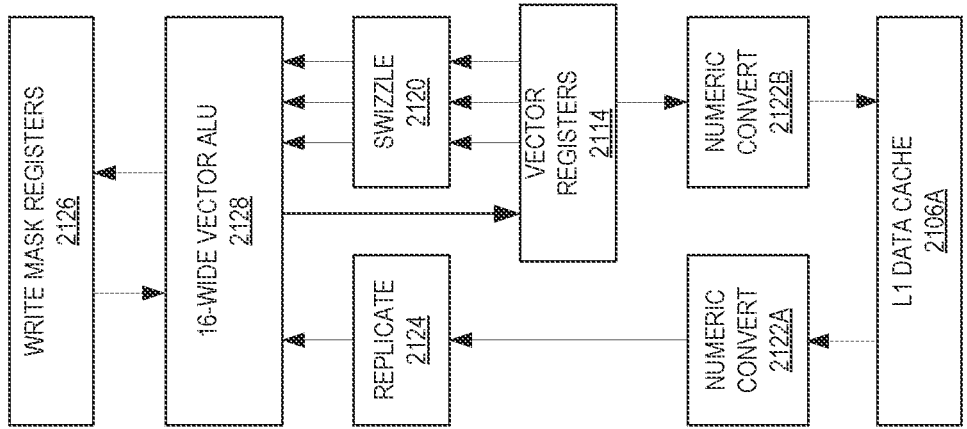
FIG. 21B is an expanded view of part of the processor core in FIG. 21A according to examples of the disclosure.
Figure 21A:
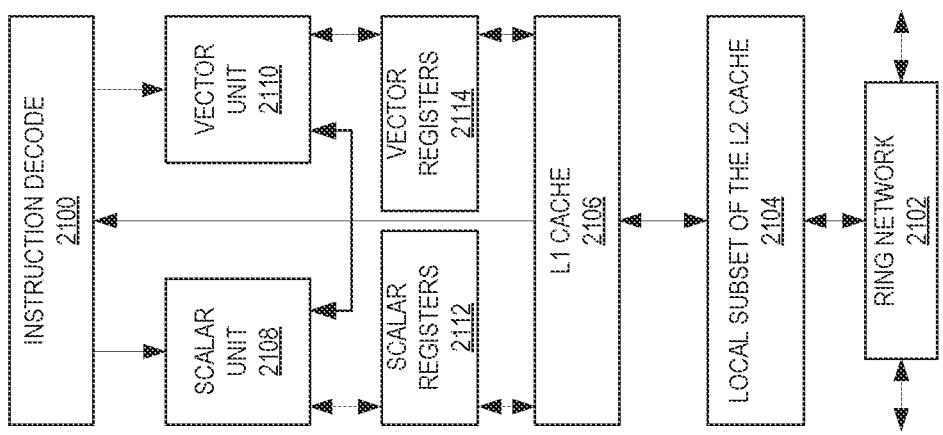
FIG. 21A is a block diagram of a single processor core, along with its connection to the on-die interconnect network and with its local subset of the Level 2 (L2) cache, according to examples of the disclosure.

FIGS. 21A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 21A is a block diagram of a single processor core, along with its connection to the on-die interconnect network 2102 and with its local subset of the Level 2 (L2) cache 2104, according to examples of the disclosure. In one example, an instruction decode unit 2100 supports the x86 instruction set with a packed data instruction set extension.

An L1 cache 2106 allows low-latency accesses to cache memory into the scalar and vector units. While in one example (to simplify the design), a scalar unit 2108 and a vector unit 2110 use separate register sets (respectively, scalar registers 2112 and vector registers 2114) and data transferred between them is written to memory and then read back in from a level 1 (L1) cache 2106, alternative examples of the disclosure may use a different approach (e.g., use a single register set or include a communication path that allow data to be transferred between the two register files without being written and read back).

The local subset of the L2 cache 2104 is part of a global L2 cache that is divided into separate local subsets, one per processor core. Each processor core has a direct access path to its own local subset of the L2 cache 2104. Data read by a processor core is stored in its L2 cache subset 2104 and can be accessed quickly, in parallel with other processor cores accessing their own local L2 cache subsets. Data written by a processor core is stored in its own L2 cache subset 2104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 21B is an expanded view of part of the processor core in FIG. 21A according to examples of the disclosure. FIG. 21B includes an L1 data cache 2106A part of the L1 cache 2104, as well as more detail regarding the vector unit 2110 and the vector registers 2114. Specifically, the vector unit 2110 is a 16-wide vector processing unit (VPU) (see the 16-wide ALU 2128), which executes one or more of integer, single-precision float, and double-precision float instructions. The VPU supports swizzling the register inputs with swizzle unit 2120, numeric conversion with numeric convert units 2122A-B, and replication with replication unit 2124 on the memory input. Write mask registers 2126 allow predicating resulting vector writes.

Figure 22:
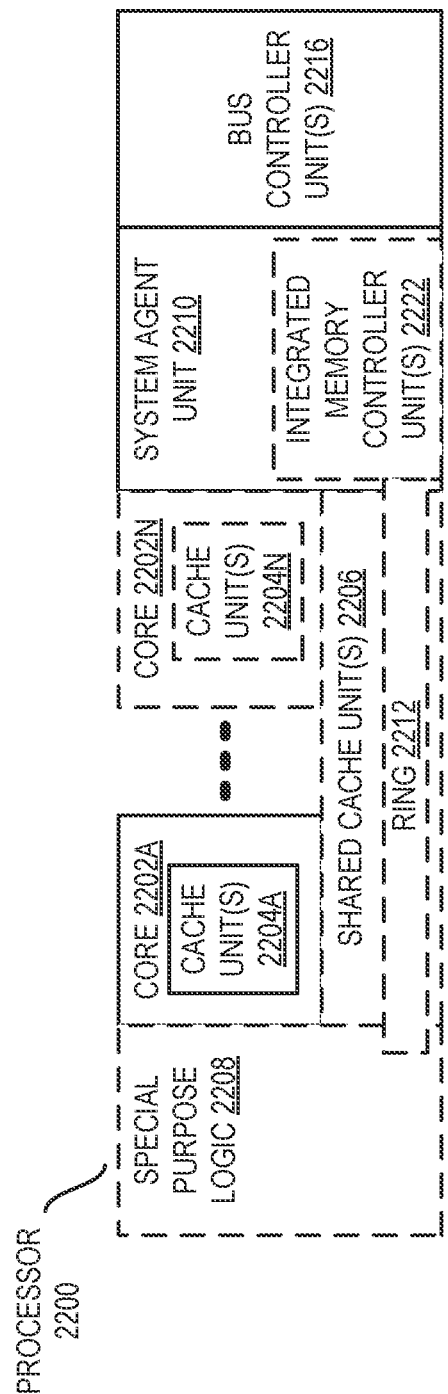
FIG. 22 is a block diagram of a processor that may have more than one core, may have an integrated memory controller, and may have integrated graphics according to examples of the disclosure.

FIG. 22 is a block diagram of a processor 2200 that may have more than one core, may have an integrated memory controller, and may have integrated graphics according to examples of the disclosure. The solid lined boxes in FIG. 22 illustrate a processor 2200 with a single core 2202A, a system agent 2210, a set of one or more bus controller units 2216, while the optional addition of the dashed lined boxes illustrates an alternative processor 2200 with multiple cores 2202A-N, a set of one or more integrated memory controller unit(s) 2214 in the system agent unit 2210, and special purpose logic 2208.

Thus, different implementations of the processor 2200 may include: 1) a CPU with the special purpose logic 2208 being integrated graphics and/or scientific (throughput) logic (which may include one or more cores), and the cores 2202A-N being one or more general purpose cores (e.g., general purpose in-order cores, general purpose out-of-order cores, a combination of the two); 2) a coprocessor with the cores 2202A-N being a large number of special purpose cores intended primarily for graphics and/or scientific (throughput); and 3) a coprocessor with the cores 2202A-N being a large number of general purpose in-order cores. Thus, the processor 2200 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2200 may be a part of and/or may be implemented on one or more substrates using any of a number of process technologies, such as, for example, BiCMOS, CMOS, or NMOS.

The memory hierarchy includes one or more levels of cache 2204A-2204N within the cores, a set or one or more shared cache units 2206, and external memory (not shown) coupled to the set of integrated memory controller units 2214. The set of shared cache units 2206 may include one or more mid-level caches, such as level 2 (L2), level 3 (L3), level 4 (L4), or other levels of cache, a last level cache (LLC), and/or combinations thereof. While in one example a ring-based interconnect unit 2212 interconnects the integrated graphics logic 2208, the set of shared cache units 2206, and the system agent unit 2210/integrated memory controller unit(s) 2214, alternative examples may use any number of well-known techniques for interconnecting such units. In one example, coherency is maintained between one or more cache units 2206 and cores 2202-A-N.

In some examples, one or more of the cores 2202A-N are capable of multi-threading. The system agent 2210 includes those components coordinating and operating cores 2202A-N. The system agent unit 2210 may include for example a power control unit (PCU) and a display unit. The PCU may be or include logic and components needed for regulating the power state of the cores 2202A-N and the integrated graphics logic 2208. The display unit is for driving one or more externally connected displays.

The cores 2202A-N may be homogenous or heterogeneous in terms of architecture instruction set; that is, two or more of the cores 2202A-N may be capable of execution the same instruction set, while others may be capable of executing only a subset of that instruction set or a different instruction set.

Exemplary Computer Architectures.

FIGS. 23-27 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 23:
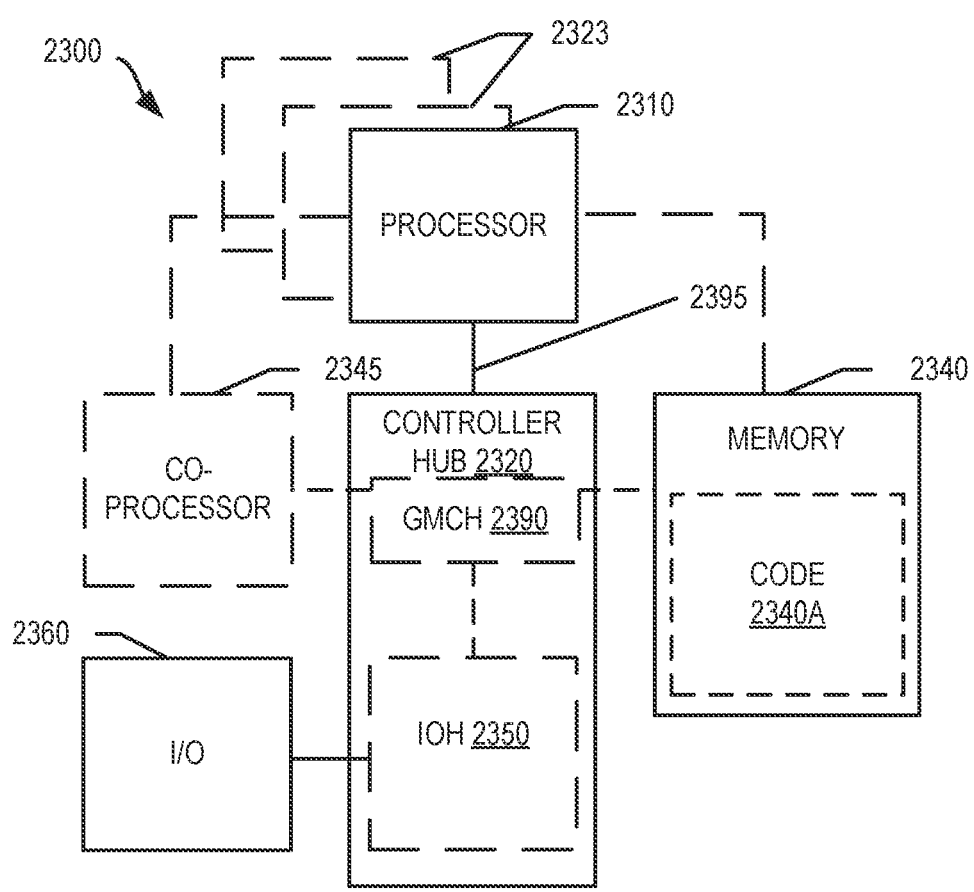
FIG. 23 is a block diagram of a system in accordance with one example of the present disclosure.

Referring now to FIG. 23, shown is a block diagram of a system 2300 in accordance with one example of the present disclosure. The system 2300 may include one or more processors 2310, 2315, which are coupled to a controller hub 2320. In one example the controller hub 2320 includes a graphics memory controller hub (GMCH) 2390 and an Input/Output Hub (IOH) 2350 (which may be on separate chips); the GMCH 2390 includes memory and graphics controllers to which are coupled memory 2340 and a coprocessor 2345; the IOH 2350 is coupled to input/output (I/O) devices 2360 to the GMCH 2390. Alternatively, one or both of the memory and graphics controllers are integrated within the processor (as described herein), the memory 2340 and the coprocessor 2345 are coupled directly to the processor 2310, and the controller hub 2320 in a single chip with the IOH 2350. Memory 2340 may include code 2340A, for example, to store code that when executed causes a processor to perform any method of this disclosure.

The optional nature of additional processors 2315 is denoted in FIG. 23 with broken lines. Each processor 2310, 2315 may include one or more of the processing cores described herein and may be some version of the processor 2200.

The memory 2340 may be, for example, dynamic random-access memory (DRAM), phase change memory (PCM), or a combination of the two. For at least one example, the controller hub 2320 communicates with the processor(s) 2310, 2315 via a multi-drop bus, such as a frontside bus (FSB), point-to-point interface such as Quickpath Interconnect (QPI), or similar connection 2395.

In one example, the coprocessor 2345 is a special-purpose processor, such as, for example, a high-throughput MIC processor, a network or communication processor, compression engine, graphics processor, GPGPU, embedded processor, or the like. In one example, controller hub 2320 may include an integrated graphics accelerator.

There can be a variety of differences between the physical resources 2310, 2315 in terms of a spectrum of metrics of merit including architectural, microarchitectural, thermal, power consumption characteristics, and the like.

In one example, the processor 2310 executes instructions that control data processing operations of a general type. Embedded within the instructions may be coprocessor instructions. The processor 2310 recognizes these coprocessor instructions as being of a type that should be executed by the attached coprocessor 2345. Accordingly, the processor 2310 issues these coprocessor instructions (or control signals representing coprocessor instructions) on a coprocessor bus or other interconnect, to coprocessor 2345. Coprocessor(s) 2345 accept and execute the received coprocessor instructions.

Figure 24:
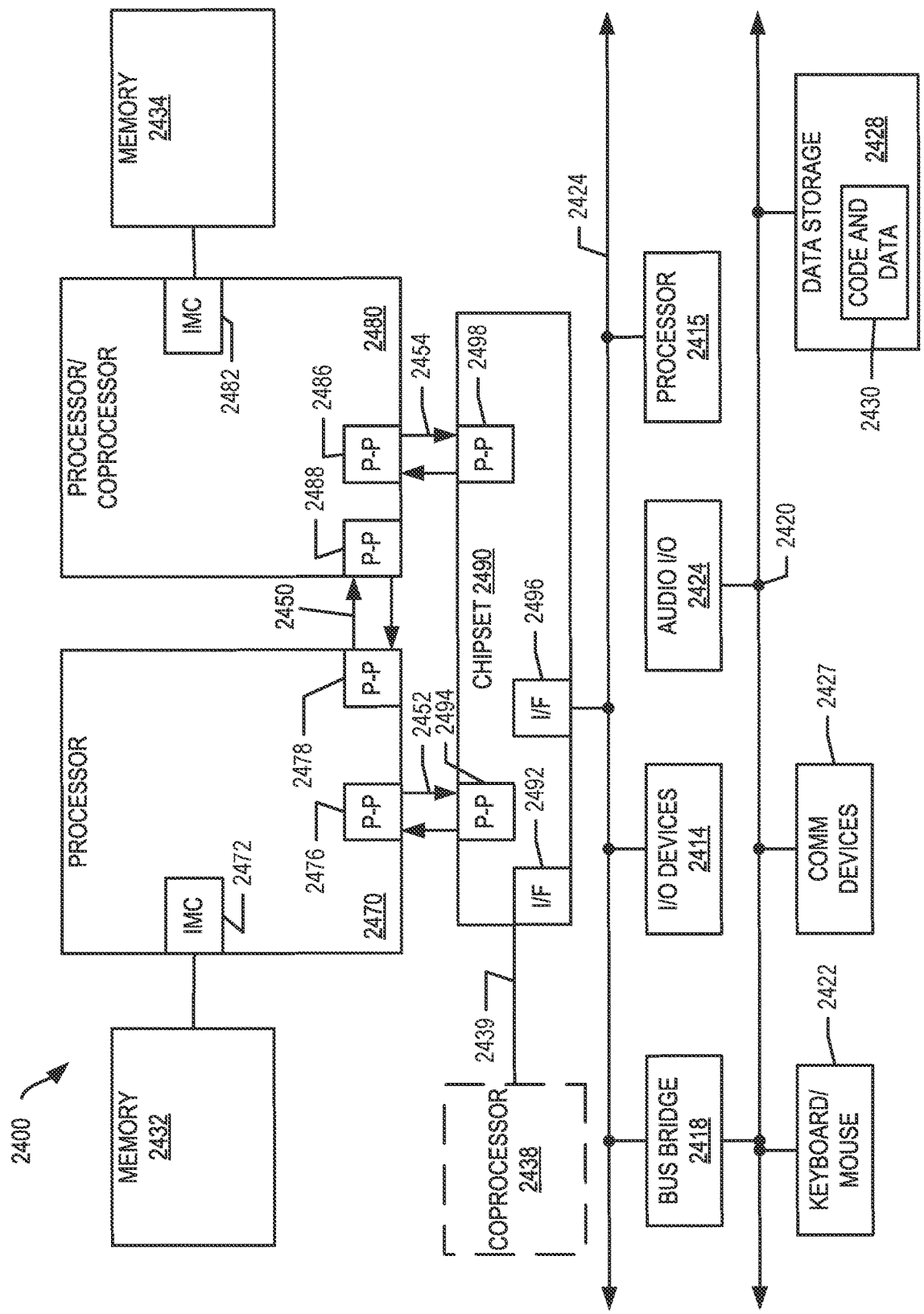
FIG. 24 is a block diagram of a more specific exemplary system in accordance with an example of the present disclosure.

Referring now to FIG. 24, shown is a block diagram of a first more specific exemplary system 2400 in accordance with an example of the present disclosure. As shown in FIG. 24, multiprocessor system 2400 is a point-to-point interconnect system, and includes a first processor 2470 and a second processor 2480 coupled via a point-to-point interconnect 2450. Each of processors 2470 and 2480 may be some version of the processor 2200. In one example of the disclosure, processors 2470 and 2480 are respectively processors 2310 and 2315, while coprocessor 2438 is coprocessor 2345. In another example, processors 2470 and 2480 are respectively processor 2310 coprocessor 2345.

Processors 2470 and 2480 are shown including integrated memory controller (IMC) units 2472 and 2482, respectively. Processor 2470 also includes as part of its bus controller units point-to-point (P-P) interfaces 2476 and 2478; similarly, second processor 2480 includes P-P interfaces 2486 and 2488. Processors 2470, 2480 may exchange information via a point-to-point (P-P) interface 2450 using P-P interface circuits 2478, 2488. As shown in FIG. 24, IMCs 2472 and 2482 couple the processors to respective memories, namely a memory 2432 and a memory 2434, which may be portions of main memory locally attached to the respective processors.

Processors 2470, 2480 may each exchange information with a chipset 2490 via individual P-P interfaces 2452, 2454 using point to point interface circuits 2476, 2494, 2486, 2498. Chipset 2490 may optionally exchange information with the coprocessor 2438 via a high-performance interface 2439. In one example, the coprocessor 2438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2490 may be coupled to a first bus 2416 via an interface 2496. In one example, first bus 2416 may be a Peripheral Component Interconnect (PCI) bus, or a bus such as a PCI Express bus or another third generation I/O interconnect bus, although the scope of the present disclosure is not so limited.

As shown in FIG. 24, various I/O devices 2414 may be coupled to first bus 2416, along with a bus bridge 2418 which couples first bus 2416 to a second bus 2420. In one example, one or more additional processor(s) 2415, such as coprocessors, high-throughput MIC processors, GPGPU's, accelerators (such as, e.g., graphics accelerators or digital signal processing (DSP) units), field programmable gate arrays, or any other processor, are coupled to first bus 2416. In one example, second bus 2420 may be a low pin count (LPC) bus. Various devices may be coupled to a second bus 2420 including, for example, a keyboard and/or mouse 2423, communication devices 2427 and a storage unit 2428 such as a disk drive or other mass storage device which may include instructions/code and data 2430, in one example. Further, an audio I/O 2424 may be coupled to the second bus 2420. Note that other architectures are possible. For example, instead of the point-to-point architecture of FIG. 24, a system may implement a multi-drop bus or other such architecture.

Figure 25:
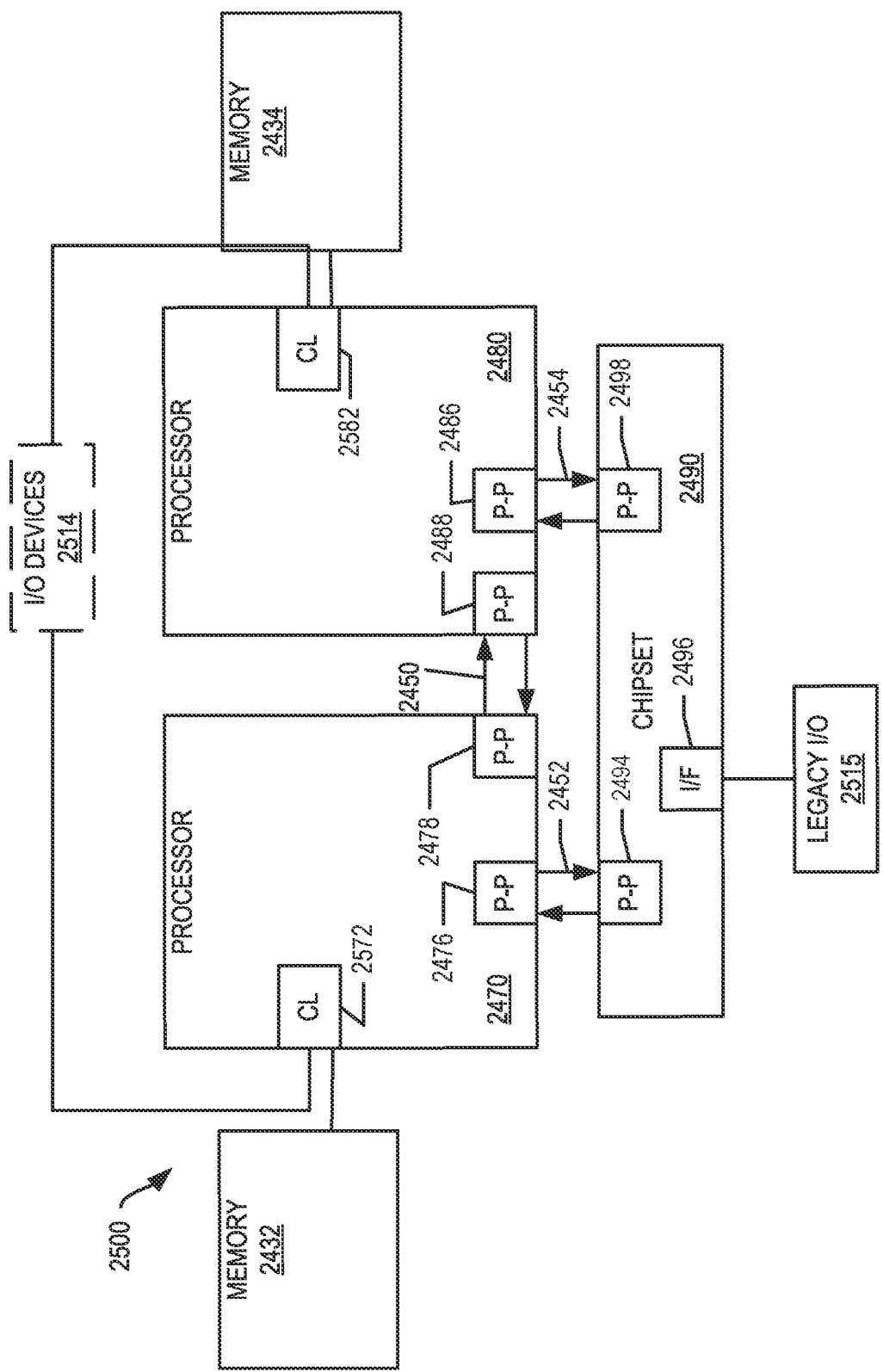
FIG. 25, shown is a block diagram of a second more specific exemplary system in accordance with an example of the present disclosure.

Referring now to FIG. 25, shown is a block diagram of a second more specific exemplary system 2500 in accordance with an example of the present disclosure. Like elements in FIGS. 24 and 25 bear like reference numerals, and certain aspects of FIG. 24 have been omitted from FIG. 25 in order to avoid obscuring other aspects of FIG. 24.

FIG. 25 illustrates that the processors 2470, 2480 may include integrated memory and I/O control logic ("CL") 2572 and 2582, respectively. Thus, the CL 2572, 2382 include integrated memory controller units and include I/O control logic. FIG. 25 illustrates that not only are the memories 2432, 2434 coupled to the CL 2572, 2582, but also that I/O devices 2514 are also coupled to the control logic 2572, 2582. Legacy I/O devices 2515 are coupled to the chipset 2490.

Figure 26:
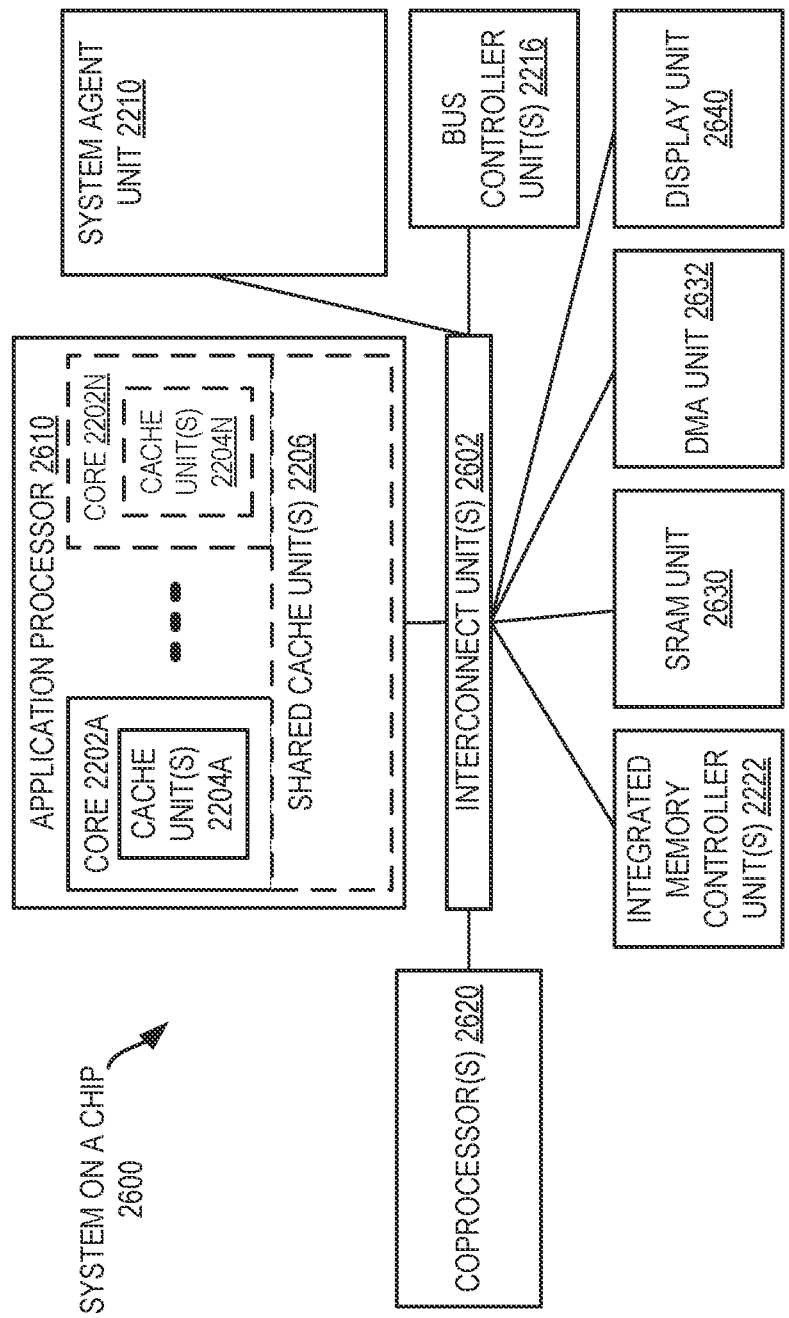
FIG. 26, shown is a block diagram of a system on a chip (SoC) in accordance with an example of the present disclosure.

Referring now to FIG. 26, shown is a block diagram of a SoC 2600 in accordance with an example of the present disclosure. Similar elements in FIG. 26 bear like reference numerals. Also, dashed lined boxes are optional features on more advanced SoCs. In FIG. 26, an interconnect unit(s) 2602 is coupled to: an application processor 2610 which includes a set of one or more cores 2202A-N and shared cache unit(s) 2206; a system agent unit 2210; a bus controller unit(s) 2216; an integrated memory controller unit(s) 2214; a set or one or more coprocessors 2620 which may include integrated graphics logic, an image processor, an audio processor, and a video processor; an static random access memory (SRAM) unit 2630; a direct memory access (DMA) unit 2632; and a display unit 2640 for coupling to one or more external displays. In one example, the coprocessor(s) 2620 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 2330 illustrated in FIG. 23, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.).

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 27 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 27 shows a program in a high-level language 2702 may be compiled using an x86 compiler 2704 to generate x86 binary code 2706 that may be natively executed by a processor with at least one x86 instruction set core 2716. The processor with at least one x86 instruction set core 2716 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2704 represents a compiler that is operable to generate x86 binary code 2706 (e.g., object code) that can, with or without additional linkage processing, be executed on the processor with at least one x86 instruction set core 2716.

Similarly, FIG. 27 shows the program in the high level language 2702 may be compiled using an alternative instruction set compiler 2708 to generate alternative instruction set binary code 2710 that may be natively executed by a processor without at least one x86 instruction set core 2714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2712 is used to convert the x86 binary code 2706 into code that may be natively executed by the processor without an x86 instruction set core 2714. This converted code is not likely to be the same as the alternative instruction set binary code 2710 because an instruction converter capable of this is difficult to make; however, the converted code will accomplish the general operation and be made up of instructions from the alternative instruction set. Thus, the instruction converter 2712 represents software, firmware, hardware, or a combination thereof that, through emulation, simulation, or any other process, allows a processor or other electronic device that does not have an x86 instruction set processor or core to execute the x86 binary code 2706.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

EXAMPLE EMBODIMENTS

The following examples pertain to further embodiments. Specifics in the examples may be used anywhere in one or more embodiments. Example 1 is an apparatus including a decoder circuit to decode a single instruction into a decoded single instruction, the single instruction comprising one or more fields to indicate a stack allocation index as an operand, and an opcode to indicate that an execution circuit is to generate a stack allocation pointer to reference an address in a stack and an address in a shadow stack; and an execution circuit to execute the decoded single instruction according to the opcode.

In Example 2, the subject matter of Example 1 can optionally include the execution circuit to determine if a stack allocation index is positive, determine if the stack allocation index is below an on-stack argument limit marker when the stack allocation index is positive; determine if the stack allocation index is above a shadow stack pointer when the stack allocation is not positive; and generate a stack allocation pointer when the stack allocation index is below the on-stack argument limit marker or the stack allocation index is above the shadow stack pointer.

In Example 3, the subject matter of Example 2 can optionally include the execution circuit to generate an exception when the stack allocation index is not below the on-stack argument limit marker or the stack allocation index is not above the shadow stack pointer. In Example 4, the subject matter of Example 2 can optionally include the stack allocation index is relative to a base address of the shadow stack. In Example 5, the subject matter of Example 1 can optionally include the execution circuit to protect the stack allocation pointer via tagging. In Example 6, the subject matter of Example 1 can optionally include the execution circuit to protect the stack allocation pointer via encryption. In Example 7, the subject matter of Example 1 can optionally include the execution circuit to allow a requested access to the stack and the shadow stack referenced by the stack allocation pointer when the address in the stack is within bounds specified in the shadow stack and the requested access is of a matching type specified in the shadow stack. In Example 8, the subject matter of Example 7 can optionally include the execution circuit to generate an exception when the address in the shadow stack is not within bounds and the requested access is not of a matching type. In Example 9, the subject matter of Example 7 can optionally include the execution circuit to compute the bounds based at least in part on a stack frame base of the shadow stack and a size of a stack allocation on the shadow stack. In Example 10, the subject matter of Example 1 can optionally include wherein the shadow stack includes metadata associated with local variables and/or on-stack arguments of a function, the stack allocation index referencing the metadata.

Example 11 is a method including determining if a stack allocation index is positive; determining if the stack allocation index is below an on-stack argument limit marker when the stack allocation index is positive; determining if the stack allocation index is above a shadow stack pointer when the stack allocation is not positive; and generating a stack allocation pointer when the stack allocation index is below the on-stack argument limit marker or the stack allocation index is above the shadow stack pointer. In Example 12, the subject matter of Example 11 can optionally include generating an exception when the stack allocation index is not below the on-stack argument limit marker or the stack allocation index is not above the shadow stack pointer. In Example 13, the subject matter of Example 11 can optionally include protecting the stack allocation pointer via tagging. In Example 14, the subject matter of Example 11 can optionally include protecting the stack allocation pointer via encryption. In Example 15, the subject matter of Example 11 can optionally include allowing a requested access to a stack using the stack allocation pointer when the requested access is within bounds and an access type supplied by a type checking instruction or a memory access instruction, or implied by the memory access instruction, matches a type of an entry in the shadow stack referenced by the access.

Example 16 is a system including a memory to a stack and a shadow stack; and a processor, coupled to the memory, including a decoder circuit to decode a single instruction into a decoded single instruction, the single instruction comprising one or more fields to indicate a stack allocation index as an operand, and an opcode to indicate that an execution circuit is to generate a stack allocation pointer to reference an address in the stack and an address in the shadow stack; and an execution circuit to execute the decoded single instruction according to the opcode. In Example 17, the subject matter of Example 16 can optionally include the execution circuit to determine if a stack allocation index is positive, determine if the stack allocation index is below an on-stack argument limit marker when the stack allocation index is positive; determine if the stack allocation index is above a shadow stack pointer when the stack allocation is not positive; and generate a stack allocation pointer when the stack allocation index is below the on-stack argument limit marker or the stack allocation index is above the shadow stack pointer.

In Example 18, the subject matter of Example 17 can optionally include the execution circuit to generate an exception when the stack allocation index is not below the on-stack argument limit marker or the stack allocation index is not above the shadow stack pointer. In Example 19, the subject matter of Example 17 can optionally include the stack allocation index is relative to a base address of the shadow stack. In Example 20, the subject matter of Example 16 can optionally include the execution circuit to allow a requested access to the stack and the shadow stack referenced by the stack allocation pointer when the address in the stack is within bounds specified in the shadow stack and the requested access is of a matching type specified in the shadow stack. In Example 21, the subject matter of Example 20 can optionally include the execution circuit to generate an exception when the address in the shadow stack is not within bounds and the requested access is not of a matching type. In Example 22, the subject matter of Example 20 can optionally include the execution circuit to compute the bounds based at least in part on a stack frame base of the shadow stack and a size of a stack allocation on the shadow stack. In Example 23, the subject matter of Example 16 can optionally include wherein the shadow stack includes metadata associated with local variables and/or on-stack arguments of a function, the stack allocation index referencing the metadata. In Example 24, the subject matter of Example 16 can optionally include wherein the stack comprises a stack portion for each of a plurality of compartments.

Example 25 is an apparatus operative to perform the method of any one of Examples 11 to 15. Example 26 is an apparatus that includes means for performing the method of any one of Examples 11 to 15. Example 27 is an apparatus that includes any combination of modules and/or units and/or logic and/or circuitry and/or means operative to perform the method of any one of Examples 11 to 15. Example 28 is an optionally non-transitory and/or tangible machine-readable medium, which optionally stores or otherwise provides instructions that if and/or when executed by a computer system or other machine are operative to cause the machine to perform the method of any one of Examples 11 to 15.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
a decoder circuit to decode a single instruction into a decoded single instruction, the single instruction comprising one or more fields to indicate a stack allocation index as an operand, and an opcode to indicate that an execution circuit is to generate a stack allocation pointer to reference an address in a stack and an address in a shadow stack indicated by the stack allocation index; and
an execution circuit to execute the decoded single instruction according to the opcode.

2. The apparatus of claim 1, comprising the execution circuit to determine if a stack allocation index is positive, determine if the stack allocation index is below an on-stack argument limit marker when the stack allocation index is positive; determine if the stack allocation index is above a shadow stack pointer when the stack allocation is not positive; and
generate a stack allocation pointer when the stack allocation index is below the on-stack argument limit marker or the stack allocation index is above the shadow stack pointer.

3. The apparatus of claim 2, comprising the execution circuit to generate an exception when the stack allocation index is not below the on-stack argument limit marker or the stack allocation index is not above the shadow stack pointer.

4. The apparatus of claim 2, comprising the stack allocation index is relative to a base address of the shadow stack.

5. The apparatus of claim 1, comprising the execution circuit to protect the stack allocation pointer via tagging.

6. The apparatus of claim 1, comprising the execution circuit to protect the stack allocation pointer via encryption.

7. The apparatus of claim 1, comprising the execution circuit to allow a requested access to the stack and the shadow stack referenced by the stack allocation pointer when the address in the stack is within bounds specified in the shadow stack and the requested access is of a matching type specified in the shadow stack.

8. The apparatus of claim 7, comprising the execution circuit to generate an exception when the address in the shadow stack is not within bounds and the requested access is not of a matching type.

9. The apparatus of claim 7, comprising the execution circuit to compute the bounds based at least in part on a stack frame base of the shadow stack and a size of a stack allocation on the shadow stack.

10. The apparatus of claim 1, wherein the shadow stack includes metadata associated with local variables and/or on-stack arguments of a function, the stack allocation index referencing the metadata.

11. A method comprising:
determining if a stack allocation index is positive;
determining if the stack allocation index is below an on-stack argument limit marker when the stack allocation index is positive;
determining if the stack allocation index is above a shadow stack pointer when the stack allocation is not positive; and
generating a stack allocation pointer when the stack allocation index is below the on-stack argument limit marker or the stack allocation index is above the shadow stack pointer.

12. The method of claim 11, comprising generating an exception when the stack allocation index is not below the on-stack argument limit marker or the stack allocation index is not above the shadow stack pointer.

13. The method of claim 11, comprising protecting the stack allocation pointer via tagging.

14. The method of claim 11, comprising protecting the stack allocation pointer via encryption.

15. The method of claim 11, comprising allowing a requested access to a stack using the stack allocation pointer when the requested access is within bounds and an access type supplied by a type checking instruction or a memory access instruction, or implied by the memory access instruction, matches a type of an entry in the shadow stack referenced by the access.

16. A system comprising:
a memory to a stack and a shadow stack; and
a processor, coupled to the memory, including
a decoder circuit to decode a single instruction into a decoded single instruction, the single instruction comprising one or more fields to indicate a stack allocation index as an operand, and an opcode to indicate that an execution circuit is to generate a stack allocation pointer to reference an address in the stack and an address in the shadow stack indicated by the stack allocation index; and
an execution circuit to execute the decoded single instruction according to the opcode.

17. The system of claim 16, comprising the execution circuit to determine if a stack allocation index is positive, determine if the stack allocation index is below an on-stack argument limit marker when the stack allocation index is positive; determine if the stack allocation index is above a shadow stack pointer when the stack allocation is not positive; and generate a stack allocation pointer when the stack allocation index is below the on-stack argument limit marker or the stack allocation index is above the shadow stack pointer.

18. The system of claim 17, comprising the execution circuit to generate an exception when the stack allocation index is not below the on-stack argument limit marker or the stack allocation index is not above the shadow stack pointer.

19. The system of claim 17, comprising the stack allocation index is relative to a base address of the shadow stack.

20. The system of claim 16, comprising the execution circuit to allow a requested access to the stack and the shadow stack referenced by the stack allocation pointer when the address in the stack is within bounds specified in the shadow stack and the requested access is of a matching type specified in the shadow stack.

21. The system of claim 20, comprising the execution circuit to generate an exception when the address in the shadow stack is not within bounds and the requested access is not of a matching type.

22. The system of claim 20, comprising the execution circuit to compute the bounds based at least in part on a stack frame base of the shadow stack and a size of a stack allocation on the shadow stack.

23. The system of claim 16, wherein the shadow stack includes metadata associated with local variables and/or on-stack arguments of a function, the stack allocation index referencing the metadata.

24. The system of claim 16, wherein the stack comprises a stack portion for each of a plurality of compartments.

\* \* \* \* \*